(12) United States Patent
Labelle

(10) Patent No.: US 6,782,395 B2
(45) Date of Patent: Aug. 24, 2004

(54) METHOD AND DEVICES FOR INDEXING AND SEEKING DIGITAL IMAGES TAKING INTO ACCOUNT THE DEFINITION OF REGIONS OF INTEREST

(75) Inventor: Lilian Labelle, Dinan (FR)

(73) Assignee: Canon Kabushiki Kaisha, Tokyo (JP)

(*) Notice: Subject to any disclaimer, the term of this patent is extended or adjusted under 35 U.S.C. 154(b) by 187 days.

(21) Appl. No.: 09/726,513

(22) Filed: Dec. 1, 2000

(65) Prior Publication Data

US 2001/0003182 A1 Jun. 7, 2001

(30) Foreign Application Priority Data

Dec. 3, 1999 (FR) .............................. 99 15281
Dec. 3, 1999 (FR) .............................. 99 15279

(51) Int. Cl.[7] .............................................. G06F 17/30
(52) U.S. Cl. ..................... 707/104.1; 707/3; 707/10; 709/202
(58) Field of Search ............................. 707/5, 104.1, 1, 707/3, 10, 100; 382/209; 358/1.14; 709/202, 201

(56) References Cited

U.S. PATENT DOCUMENTS

| | | | |
|---|---|---|---|
| 5,579,471 A | 11/1996 | Barber et al. ............... 395/326 |
| 5,652,881 A | 7/1997 | Takahashi et al. ........... 395/615 |
| 5,915,038 A | * 6/1999 | Abdel-Mottaleb et al. .. 382/209 |
| 5,983,237 A | * 11/1999 | Jain et al. .................. 707/104.1 |
| 6,005,679 A | 12/1999 | Haneda ........................ 358/453 |
| 6,043,897 A | * 3/2000 | Morikawa et al. .......... 358/1.14 |
| 6,263,334 B1 | * 7/2001 | Fayyad et al. ................. 707/5 |

FOREIGN PATENT DOCUMENTS

| | | | |
|---|---|---|---|
| JP | 08/063573 | 3/1996 | ............. G06T/1/00 |
| WO | WO 98/52119 | 11/1998 | ............. G06F/3/14 |

OTHER PUBLICATIONS

"The Qbic project: Querying Images by Content Using Color, Texture and Shape", Niblack W. et al., IBM Computer Sciences Research Report, pp. 1–20 (1st Feb., 1993).
"Defining Image Content With Multiple regions–of–Interest", B. Moghaddam et al., Proceedings IEEE Workshop On Content–Based Access of Image and Video Librarites, Fort Collins, Co., USA, Jun. 22, 1999, pp. 89–93, XP002153364.
"Image GREP: Fast Visual Pattern Matching In Image Databases", D. White et al., Proceedings of SPIE, U.S., Bellingham, SPIE, vol. 3022, 13 f'eiver 1997, pp. 96–107, XP000742374.
"NeTra: A Toolbox For Navigating Lare Image Databases", W.Y. Ma et al., Proceedings of The Int'l Conference On Image Processing, U.S.N.S. Los Alamitos, CA: IEEE 26Oct97, pp. 568–571, XP000792837.

* cited by examiner

Primary Examiner—Charles Rones
Assistant Examiner—Hassan Mahmoudi
(74) Attorney, Agent, or Firm—Fitzpatrick, Cella, Harper & Scinto

(57) ABSTRACT

A method of seeking digital images from among a plurality of images stored in a database by using an example image. Each of the plurality of stored images in the database is associated with a data item representing at least one characteristic of the visual content of the image.

32 Claims, 9 Drawing Sheets

METHOD AND DEVICES FOR INDEXING AND SEEKING DIGITAL IMAGES TAKING INTO ACCOUNT THE DEFINITION OF REGIONS OF INTEREST

TECHNICAL FIELD

The present invention concerns, in accordance with a first aspect, a method of seeking images, using an example image, from amongst a plurality of images stored in a database, each of the stored images being associated with a data item representing at least one characteristic of the visual content of the image. The invention also concerns a device able to implement such a method.

According to a second aspect, the present invention concerns a method of indexing digital images taking into account the location of regions of interest in the images. The invention also concerns a method of seeking images from an example image, from amongst a plurality of images stored in a database, the images being indexed according to the above-mentioned indexing method. The invention also concerns a device able to implement such methods of indexing and seeking images.

BACKGROUND OF THE INVENTION

A conventional method of seeking digital images in a database containing images is based on a system of indexing the images in the database.

The purpose of the indexing system is to associate, with each image in the base, an item of information characteristic of the content of the image referred to as the index of the image. All these information items form the index of the database.

A user can then interrogate the image database through a request containing an item of information characteristic of the type of image sought. The content of the request is then compared in accordance with a search strategy with the content of the index of the database.

Finally, the image in the base whose indexed information item has the greatest similarity to the content of the request is then extracted. A plurality of images extracted from the base can also be presented to the user, ordered according to their degree of similarity to the request.

In a traditional system of indexing digital images, the index of the database is composed of textual descriptors of the images stored.

The request of the user then consists of key words describing the characteristics of the content of the image to be sought.

This type of indexing by textual descriptors has the drawback of being imprecise, in particular because the same image may be described in different ways by different users.

In order to mitigate this type of drawback, the need has therefore been felt to develop techniques for representing and extracting the semantic content of a digital image.

Methods have appeared in which an image is characterised according to the distribution of the colours or textures making it up.

In other methods, an image is characterised by the shape or contour of an object making it up.

However, all these descriptors, referred to as "primitives", of the image, reflect only physical characteristics of the image, and are therefore of a low semantic level.

In order to increase the semantic character of the indexing of the images, indexing systems which use a combination of low-level primitives are beginning to appear.

One of the most well-known is certainly the QBIC ("query-by-image-content") system developed by IBM.

To obtain more details on this system, reference can be made to the article "*The QBIC Project; Querying Images by Content Using Color, Texture, and Shape*", by Niblack, W et al., which appeared in IBM Computer Sciences Research Report, pp 1–20 (Feb. 1, 1993). Reference can also be made to U.S. Pat. No. 5,579,471 of IBM entitled "*Image query system and method*".

The QBIC system makes it possible to find digital fixed (or video) images from a request by means of the example. In the particular case of fixed images, this request is defined either as a complete image or as an object with a rectangular or arbitrary shape, extracted from an image or defined by the user.

The content of the images in the database is characterised by its colour distribution (histogram), texture and shape.

Where the request is defined as a portion, also referred to as a region, of an image, the similarity measurement also takes account of the spatial position of this region.

However, in the QBIC system and in the indexing systems of this type, the indexing of an image stored in the database relates to the entire content of the image, without consideration of the zone or region which particularly represents the visual content of the image.

Moreover, the request at best relates only to a single portion of the example image.

However, in a given image, several distinct regions may contain a great deal of semantic information. Consequently, in spite of the combination of several primitives for indexing the content of the image, this type of index is not sufficiently representative of the semantic content of the image.

Thus, in the indexing systems of the QBIC system type, an analysis of the similarity between an index derived from a request and that derived from a stored image is normally still insufficiently precise.

In the following description, the expression "region of interest" (ROI) is used to mean a delimited portion of a given image predefined as containing elements characteristic of the visual content of the image, that is to say as containing a great deal of semantic information.

The present invention aims to remedy the aforementioned drawbacks of the search and indexing systems of the prior art.

SUMMARY OF THE INVENTION

To this end, in accordance with a first aspect, the present invention concerns a method of seeking images, from an example image, from amongst a plurality of images stored in a database, each of the stored images being associated with a data item of a first type representing at least one characteristic of the visual content of the image. In accordance with the invention this image search method includes the following steps:

each time a new image is stored in the database, associating with the new image a data item of a second type representing the location of at least one region of interest in the new image;

receiving a data item of the second type representing the location of at least one region of interest in the example image;

obtaining a data item of the first type associated with the example image;

calculating a similarity between the example image and each of the images amongst at least one subset of said stored images, the similarity being calculated from the data of the first type and of the second type associated respectively with the example image and with the stored image; and supplying at least one image, referred to as the result image, of the database, the result image being selected from amongst the stored images in the database according to its degree of similarity with the example image.

In this way, taking account of the data representing the location of at least one region of interest (data item of the second type), in the example image and in the images of the database, the search for images in the database is more precise. This is because on the one hand, for each image in the database, the database manager has taken care to isolate the semantic content of the image through this data item of the second type. The user, on the other hand, through the data item of the second type associated with the example image, can also specify his request by choosing in the image certain regions which correspond to the one which he wishes to find. Consequently there is obtained a similarity closer to reality compared with the one obtained when this type of data is not taken into account both in the example image and in the images in the database.

The present invention also concerns a device for seeking images, from an example image, from amongst a plurality of images stored in a database. In accordance with the invention this device has means adapted to implement an image search method as succinctly defined above.

The present invention also concerns a computer, comprising such an image search device or means adapted to implement the above-defined image search method. The invention also relates to a computer program including one or more sequences of instructions able to implement the above-defined image search method when the program is loaded and executed in a computer. The invention also relates to an information carrier, such as a diskette or compact disc (CD), characterised in that it contains such a computer program.

The advantages of this device, computer, computer program and information carrier are identical to those of the method as succinctly disclosed above.

In accordance with a second aspect, the present invention concerns a method of indexing a digital image. According to the invention, this indexing method comprises the following steps, for each image Im, to be indexed;

dividing the image plane of the image Im, in accordance with a partitioning including a predefined number N of blocks $B_i$;

extracting from each of the blocks a data item of a first type representing at least one characteristic of the visual content of the block;

defining in the image at least one region of interest, and obtaining a data item of a second type representing the location of at least one region of interest in the image;

calculating for each of the blocks $B_i$ a first coefficient, $W_i^{Im}$, indicating a degree of presence in the block under consideration of the image of the region or regions or interest;

associating with the image Im an index composed of a first vector G(Im), having N components, each of which being one of the data items of the first type, and a second vector W(Im), having N components, each of which being one of the first coefficients $W_i^{Im}$.

In this way, there is obtained for each image an index which is much more precise with regard to its representativeness with respect to the semantic content of the image.

This is because the index thus obtained takes into account the data item representing the location of at least one region of interest (data item of the second type) by means of the vector W(Im) and the data item representing at least one characteristic of the visual content of the image per block of the image (data item of the first type) by virtue of the vector G(Im). Combining these two types of data by blocks issuing from a division of the image also helps to increase the precision of the index associated with the image.

Correlatively, the invention concerns a method of seeking images, from an example image, from amongst a plurality of images stored in a database. This image search method is characterised by the fact that the example image and each of the stored images are indexed according to an image indexing method as briefly defined above.

By the use of such a method for indexing the example image and the images stored in the database, the image search method thus obtained makes it possible to obtain a search result which is much more precise than the search systems of the prior art which do not use this type of image indexing.

This is because on the one hand, for each image in the database, the database manager has taken care to specify the semantic content of the image by the definition of regions of interest in the image, these being taken into account through the vector W(Im) present in the index of the image. The user, on the other hand, through the data item of the second type associated with the example image, can also specify his request by choosing, in the image, certain regions which correspond to that which he wishes to find. Calculation of a vector W(Im) associated with the index of the image then makes it possible to take into account these regions of interest in the search.

The invention also concerns a device for seeking images, from an example image, from amongst a plurality of images stored in a database. In accordance with the invention this device has means adapted to implement a method of indexing and/or a method of seeking images, as succinctly defined above in connection with the second aspect of the invention.

The present invention also concerns a computer, having means adapted to implement a method of indexing and/or a method of seeking images, as defined above in relation to the second aspect of the invention, or having an above-mentioned device for seeking images. The invention also relates to a computer program containing one or more sequences of instructions able to implement such an image search method when the program is loaded and executed in a computer. The invention also relates to an information carrier, such as a diskette or compact disc (CD), characterised in that it contains such a computer program.

The advantages of this image search device, this computer, this computer program and this information carrier are identical to those of the image indexing/search methods as succinctly disclosed above.

Other particularities and advantages of the invention will also emerge from the following description.

BRIEF DESCRIPTION OF THE DRAWINGS

In the accompanying drawings, given by way of non-limitative example embodiments.

DETAILED DESCRIPTION OF THE INVENTION

Figure 1:
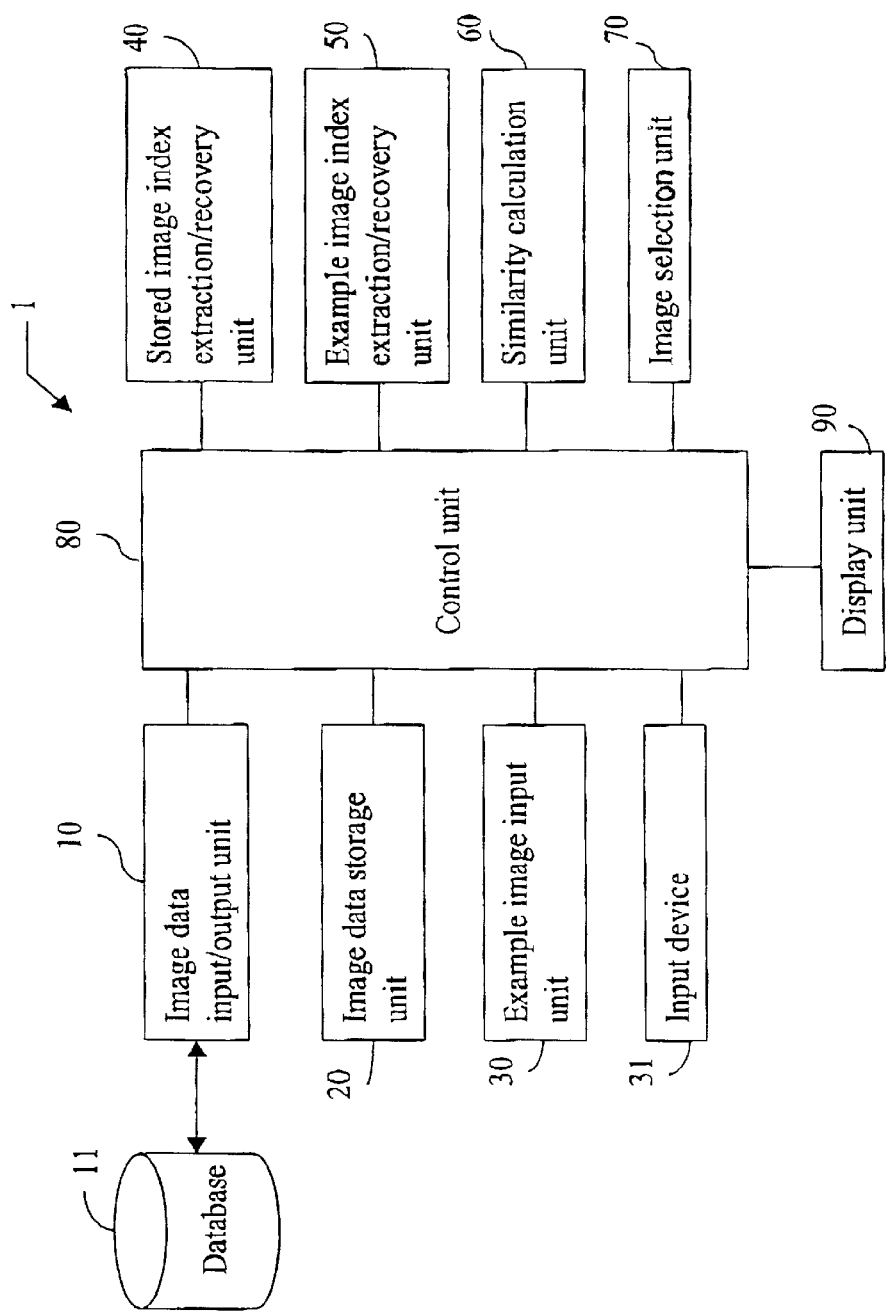
FIG. 1 is a block diagram illustrating the general architecture of an image search device in a database according to the present invention.

A description will first of all be given, with reference to FIG. 1, of a block diagram illustrating the general architecture of an image search device (1) according to the present invention. The device 1 contains hardware elements and software elements.

The device depicted in FIG. 1 comprises an image data input/output unit 10 intended to allow the inputting, into a database 11, of new images to be stored, and to recover a stored image and/or the data indexed at the stored image.

A unit 30 for inputting an example image is associated with an input device 31 to enable a user to input or indicate an example image whose comparison with the stored images in the database will make it possible to obtain one or more images as a result of the search. These images can be displayed on a display unit 90.

The device 1 also comprises an image data storage unit 20, intended to temporarily store the data recovered from the database 11 or the data associated with the example image obtained by the units 30 and 31.

The device of FIG. 1 also comprises a unit 40 for recovering index data associated with the images stored in the database 11, or extracting index data associated with images which are to be stored in the database, depending on circumstances.

In the same way a unit 50 is responsible for extracting or recovering the index data of the example image.

A similarity calculation unit 60 is responsible for evaluating the similarity of the example image with the database images. An image selection unit 70 is then responsible for sorting the database images according to their similarity with the example image, and for selecting one or more images stored as a result of the search. In a preferred embodiment of the invention the selected images are then displayed by the display unit 90.

Finally, the image search device depicted in FIG. 1 has a control unit 80, for controlling the overall functioning of the device.

Each image stored in the database 11 is indexed as follows. When a new image is to be stored in the database, there is previously extracted from it a data item representing at least one characteristic of the visual content of the image. In accordance with one preferred embodiment of the invention, this data item is characteristic of the distribution of the colours (histograms of colours) in the image.

The invention also applies to the case where the images are stored in compressed form. In this case, an image is represented by a bit stream. For example, where the compression algorithm uses digital wavelet transform known from the state of the art, it will be possible to characterise the content of the original image by considering a particular sub-band of the image.

In accordance with the invention, a second data item representing the location of at least one region of interest in the image is also associated with each of the images which are to be stored in the database.

These regions of interest (ROIs), which are regions of the image considered to contain a great deal of semantic information, can be defined by the person managing the database, according to his individual perception of the visual information characteristic of the image, using for example means similar to those mentioned above for the user (mouse, keyboard, etc).

The regions of interest can also be defined automatically according to other criteria, at the time when the image is entered into the database. In particular, where the images are stored in compressed form, the regions of interest can coincide with the zones of the image which were specified for the compression algorithm for the purpose of coding certain zones of the image more finely.

In a particular embodiment of the invention, the data item representing the ROI or ROIs associated with an image stored in the database comprises a set of two-dimensional points (2D points). In this way, there is obtained a method of representing a region of interest which is inexpensive in terms of computer resources and which is sufficient from the point of view of the use which is made thereof.

Finally, with each image stored in the database there is associated a first data item, referred to in the remainder of the description as "content data item" or "data item of the first type", representing at least one characteristic of the visual content of the image, and a second data item, referred to in the remainder of the description as "data item indicative of ROIs" or "data item of the second type", representing the location of at least one region of interest in the image.

The indexing of an image which is to be stored in the database is effected as mentioned previously, by the stored image index extraction/recovery unit 40.

Figure 2:
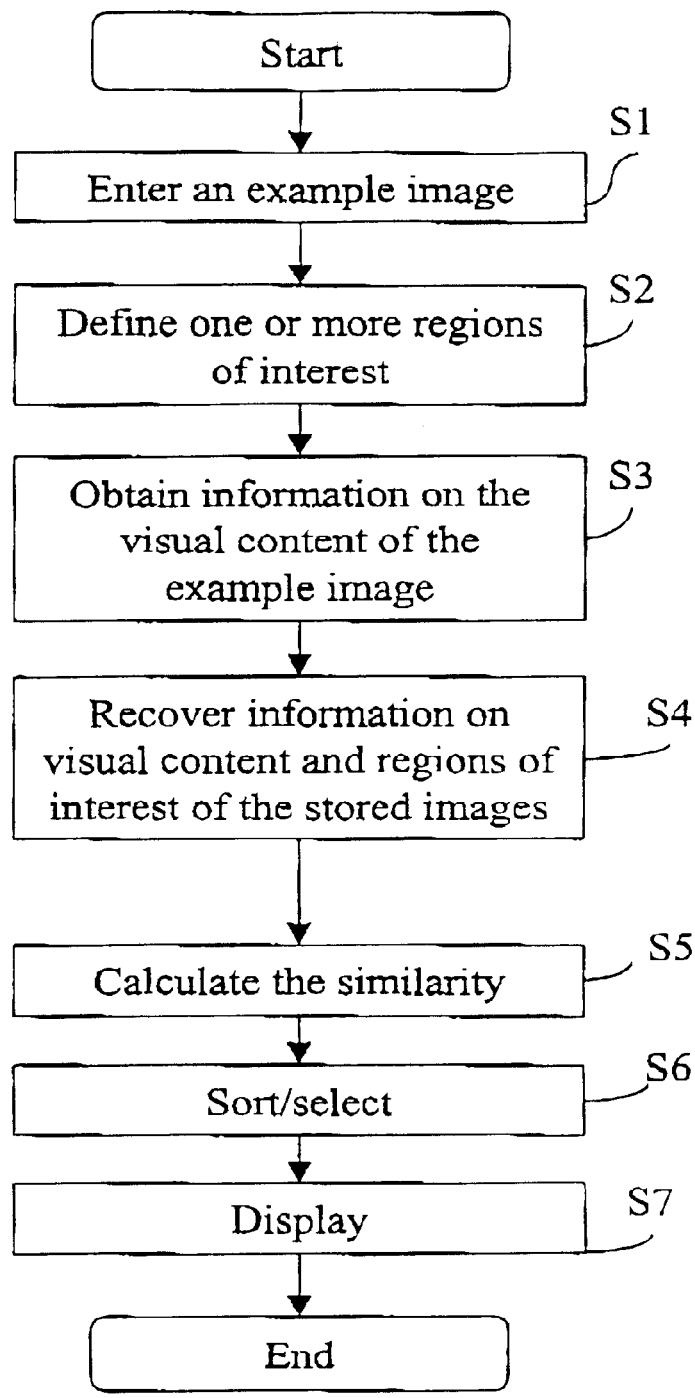
FIG. 2 depicts a flow diagram illustrating the sequence of the steps of an image search method according to the present invention.

With reference now to FIG. 2, a description will be given of the image search method according to the present invention implemented by the image search device (1) depicted in FIG. 1.

The search method commences with step S1 in which a human user uses the example image input unit 30 associated with the input device 31 in order to define an example image which will serve as a reference for seeking images in the database. The user has the choice, for defining the example image, between designating an image in the database, or supplying an image external to the database.

According to a preferred embodiment of the invention, the input device 31 has a pointing device such as a mouse, as well as a keyboard, and the display unit 90 includes a screen.

To enable the user to choose an image in the database as an example image, the search device displays on the screen 90 icons representing the images in the database. The user can then select, by means of the mouse, the icon of the image whose content seems to him to be closest to that of the image or images which he is seeking. As a variant, the user can also use the keyboard for entering the reference of the stored image which he chooses as an example image.

If the user chooses to provide an image external to the database, he can for example supply to the search device 1 the access path to the example image which will be accessible via a disk drive or compact disc (CD ROM) drive integrated into the input device 31.

Returning to FIG. 2, once the user has entered (step S1) an example image in the image search device 1, the latter defines, at step S2, one or more regions of interest (ROIs) associated with the example image.

According to a preferred embodiment of the invention, the example image chosen is displayed on the screen, and the user uses the mouse of the input device 1 to draw the contour of a region of interest (ROI) of the image, for example using the mouse according to the method known by the expression "drag and drop". The contour drawn may be of a normal geometric shape such as a circle, or a polygon, or any shape. Once the contour of the region of interest has been drawn, the user validates the contour, for example by pressing a key on the keyboard. The contour is then transformed into a set of 2D points which defines the shape and spatial position of this region on the image plane.

The user has the possibility of defining several regions of interest according to the same operation.

The set of data corresponding to the regions of interest in the example image is then stored in the image data storage unit 20.

NB: when the example image is an image external to the database and if the user does not define regions of interest in the example image chosen, then the search device uses by default, for the similarity calculation, the regions of interest predefined for the example image in the database.

At the following step S3, the example image index extraction/recovery unit 50 is responsible for obtaining an item of information on the visual content of the example image, that is to say a data item representing at least one characteristic of the visual content of the example image.

This data item is of the same type as those which are indexed to the images stored in the database.

Two cases may then arise. If the example image is a stored image, the unit 50 will seek this data item in the index associated with this image in the database (11).

On the other hand, if the example image is an image external to the database supplied by the user, the example image is first of all copied into memory in the unit 20 of the device 1. The unit 50 then extracts the content data item (representing at least one characteristic of the visual content of the image) from the example image.

It should be noted that the method of extracting the content data item from the example image is the same as that which is applied to an image intended to be stored in the database. Methods of extracting the content data item from an image will be detailed later in the description in relation to FIGS. 3, 5 and 8.

Once extracted or recovered, the content data item is associated with the data item indicative of ROIs obtained at the previous step S2, in order to constitute the index of the example image. The index of the example image is then saved in the image data storage unit 20 in order to be used subsequently.

At the following step S4, the stored image index recovery unit 40 will recover, from the database, the indexes associated with the images from amongst at least one subset of the stored images. As explained before, each index comprises a content data item and a data item indicative of ROIs. The indexes extracted from the database are then saved in the image data storage unit 20.

As mentioned above, it may be sufficient to extract from the database the indexes associated with only some of the stored images. In fact this may be the case when the database is organised hierarchically, so as to group the images in the database in different classes. Each of the classes is then represented by an index having a different semantic value. Thus, by defining a similarity measurement associated with each of these indexes, a number of similarity calculations will be effected which is less than that which would have been affected if the database were not organised hierarchically.

At step S5, the similarity calculation unit 60 recovers the indexes of the stored images and the index of the example image previously stored in the unit 20, and makes a calculation of similarity between the example image and each of the stored images whose index was extracted from the database.

In accordance with the present invention, the similarity calculation effected at step S5 takes into account the content and ROI data associated respectively with the example image and with a given stored image.

Similarity calculation methods according to preferred embodiments of the invention will be detailed subsequently in relation to FIGS. 4 and 7.

Once the similarity calculation has been carried out at step S5, there is carried out at step S6 a sorting and selection of the stored images which were compared with the example image, according to their degree of similarity with the example image.

For example, according to a particular embodiment of the invention, only the stored images whose degree of similarity calculated is greater than a predefined threshold are kept. Amongst the latter only a predefined number of images (for example ten) are selected, those having the highest degree of similarity. The selected images are then displayed on a screen (step S7) in an order of similarity (increasing or decreasing). The user then makes his choice.

As a variant, all the images which were compared with the example image are displayed on the screen in an order of similarity.

In a second variant, only the image in the database which has the greatest similarity to the example image is displayed.

Steps S6 (sorting/selection) and S7 (display) are implemented by the image selection unit 70 of the image search device 1 depicted in FIG. 1.

The control unit 80 of the device 1 controls the sequencing of the steps of the image search method and manages the interoperability between the different units constituting said device.

Figure 3:
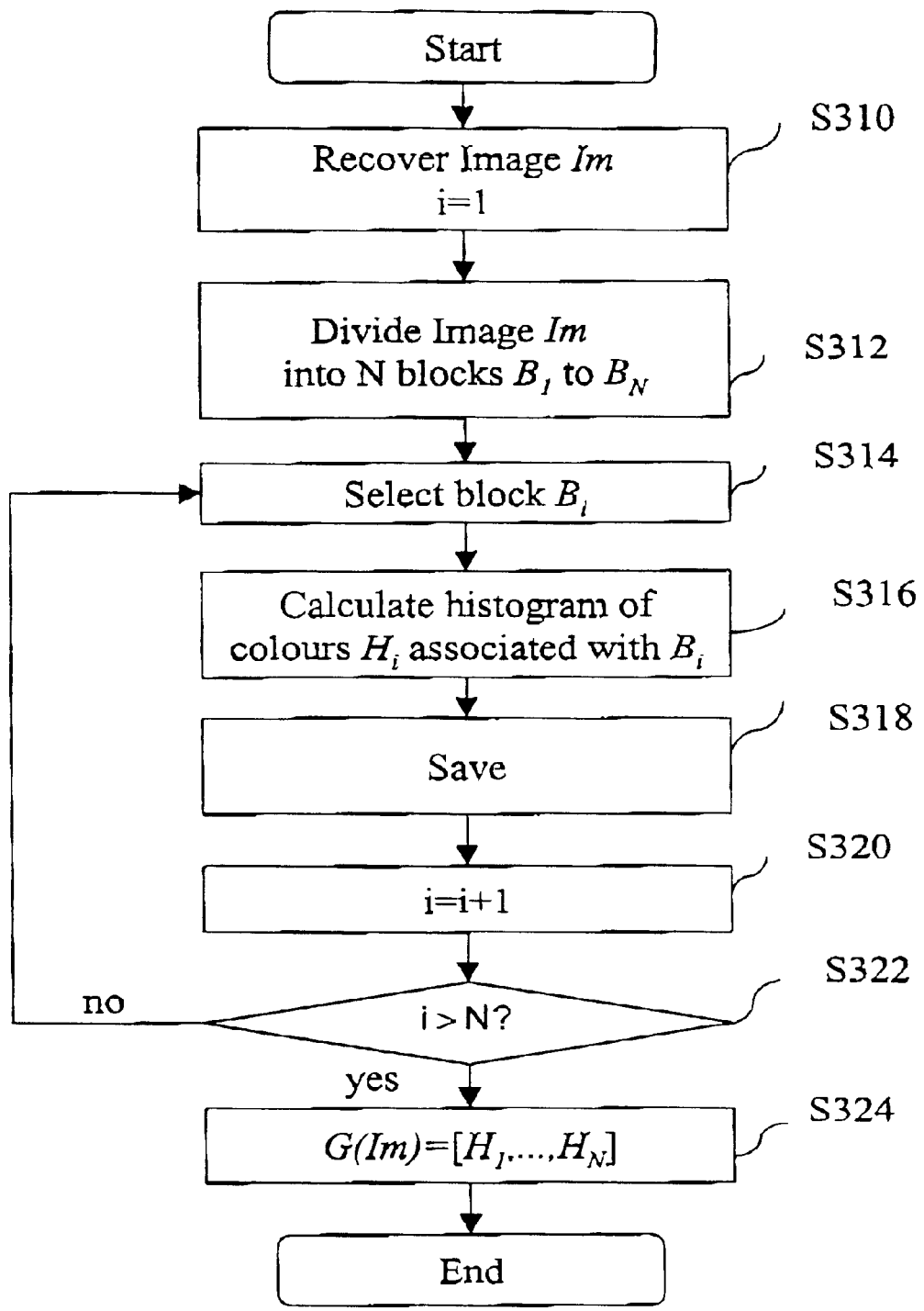
FIG. 3 depicts a flow diagram illustrating a method of extracting an item of information representing the visual content of an image according to a preferred embodiment of the first aspect of invention.

With reference now to FIG. 3, a description will be given of the method of extracting an item of information representing the visual content of an image according to a preferred embodiment of the first aspect of the invention.

The extraction method depicted in FIG. 3 is used both for extracting the content data item during the indexing of an image which is to be stored in the database, and for extracting the content data item of an example image when this is supplied externally to the database by the user. In the first case, the operation is performed by the stored image index recovery/extraction unit 40. In the latter case, the extraction of the content data item is performed by the example image index recovery/extraction unit 50.

The extraction method depicted in FIG. 3 starts with step S310 in which the image Im to be processed is recovered. If it is a case of the example image, this can be recovered in the form of a bitmap representation stored previously in the image data storage unit 20. As a variant, the image can be recovered in the form of a compressed image.

Still at step S310, a counter i is initialised to the value 1. At the following step S312, the recovered image Im is divided in accordance with a partitioning of N (N is an integer) blocks $B_1$ to $B_N$.

It should be stated here that the term "partitioning" must be understood here in its mathematical sense which is given below.

A partitioning of a set is a division of this set into non-empty parts, in separate pairs, the combination of which is equal to the set.

It should be noted that this partitioning may be of any type and may be different for each of the stored images in the database and for the example image. However, it is necessary for the number of blocks to be the same and for the number of image points ("pixels" or "picture elements") in each block ($B_i$) to be sufficient. In practice, the number of points should be greater than 100. This is because, if this condition is not met, the histograms of colours which will be extracted from the blocks, in accordance with a preferred embodiment of the invention, will be only very slightly significant of the visual content of a given block.

Figure 8:
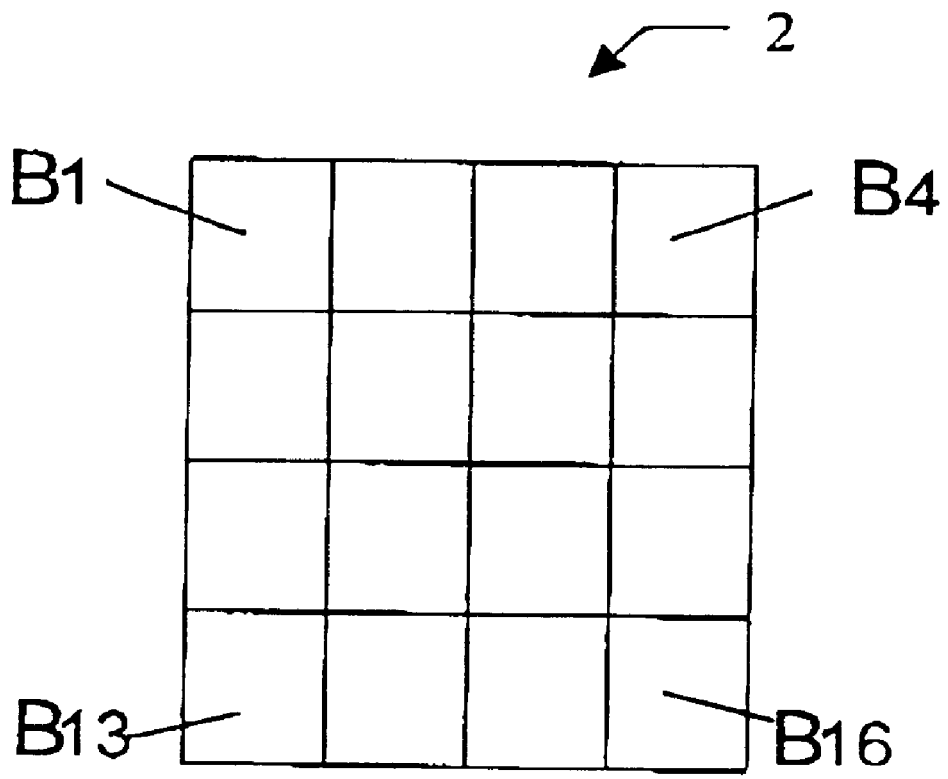
FIG. 8 illustrates an example of a method of dividing an image into N blocks in accordance with a preferred embodiment of the invention.

In a preferred embodiment of the invention, the image to be processed is divided in a rectangular grid into 16 blocks (N=16), as illustrated in FIG. 8, in which an image to be indexed 2 is divided into 16 blocks with the same surface area $B_1$ to $B_{16}$. As explained below in relation to FIG. 3, each of the blocks making up the image is considered one after the other, in order to extract therefrom information representing the visual content of this block. As previously mentioned, this information is an histogram of colours, in a preferred embodiment of the invention.

Returning to FIG. 3, once the image to be processed has been divided into N blocks (step S312), at the following step S314 a block of the image $B_i$ is selected. As the counter i was previously initialised to 1 (step S310), the first step is to select the block $B_1$ (i=1).

At the following step S316, the histogram of colours $H_i$ associated with the block $B_i$ selected is calculated.

The method used in the context of the present invention for calculating a histogram of colours from an image is known from the state of the art. In order to obtain more details on the indexing of an image based on colour, reference can for example be made to the article by M. J. Swain and D. H. Ballard, entitled "Color Indexing", International Journal of Computer Vision, 7:1, 1991.

At the following step S318, the histogram of colours calculated at the previous step (S316) for the block of the image selected is saved in the image data storage unit 20.

At the following step S320, the counter i is incremented. The following step S322 is a decision step in which it is determined whether or not the counter i is strictly greater than the predefined number N (number of blocks in the image).

In the negative, step S312 is performed once again in order to select the next block of the image in order to calculate its corresponding histogram of colours (steps S316 and S318), the counter i is then once again incremented (S320) and tested (S322).

If the counter i is strictly greater than the number N of blocks, this means that the last block which was selected is the block $B_N$. Consequently, all the blocks in the image have been processed. In this case, the final step S324 is passed to, in which all the calculated histograms of colours corresponding to the different blocks of the image Im are grouped together in a vector of N components:

$$G(Im)=[H_1, \ldots, H_N].$$

Each of the components $H_i$ of the vector G(Im) corresponds to the histogram of colours calculated for the block $B_i$ of the image.

It should be noted that, if C designates the total number of colours available (palette of colours), each histogram $H_i$ includes C elements.

It should also be noted that, although in the preferred embodiment of the invention, the space of the colours used is the RGB space, any other space, for example the HSV space, can also be used.

The vector G(Im) associated with the image Im constitutes the "content data item" or "data item of the first type", representing at least one characteristic of the visual content of the image. The characteristic of the visual content of the image consisting, in accordance with a preferred embodiment of the invention, of all the distributions of colours (histograms) associated with the blocks of the image.

Thus, there is obtained for each image a data item representing at least one characteristic of the visual content of the image (data item of the first type) which has a "local" character (by block). This "local" character makes it possible notably to implement the similarity calculation process according to the invention which will be detailed later in connection with FIG. 4.

Consequently the index of any image Im issuing from the database or input as an example image, once this index has been recovered or extracted, consists of the vector G(Im) defined above, and a data item representing the location of at least one region of interest in the image (data item indicative of ROIs) denoted as from now: ROI(Im).

In the remainder of the description, the term "ROI(Im)" will be used to designate indifferently either a region of interest associated with the image Im or the data item indicative of regions of interest in this image.

Thus the index associated with any image Im can be denoted Index(Im) in the following manner:

$$Index(Im)=(G(Im); ROI(Im)).$$

Figure 4:
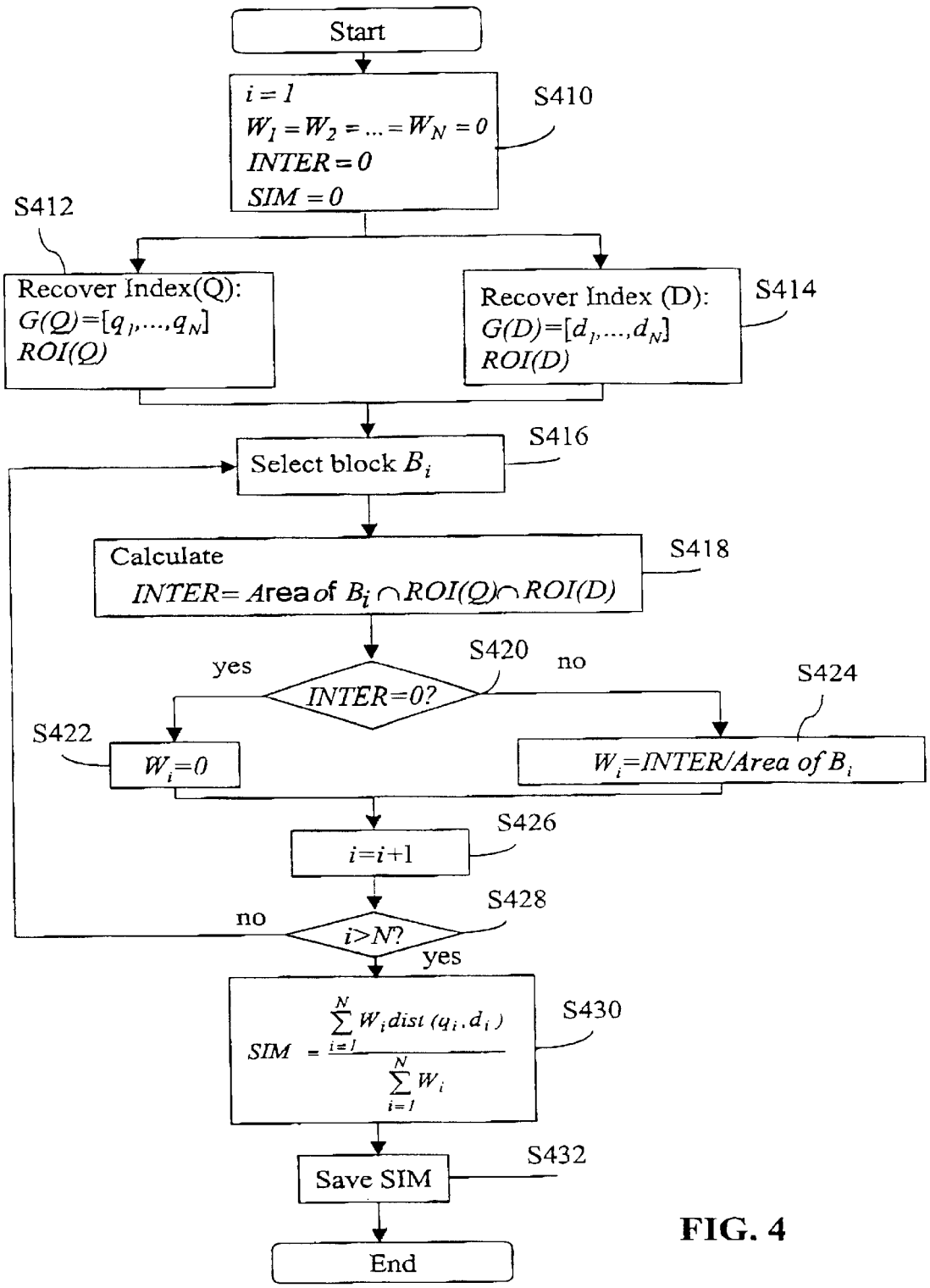
FIG. 4 depicts a flow diagram illustrating a method of calculating the similarity between an example image and an image in the database according to a preferred embodiment of the first aspect of the invention.

With reference now to FIG. 4, a description will be given of the method of calculating the similarity between an example and an image in the database according to a preferred embodiment of the first aspect of the invention. The flow diagram in FIG. 4 details step S5 from the previously described FIG. 2.

So as to simplify the description of the invention, in the example embodiment illustrated by FIG. 4, it is assumed that, for each of the stored images, and for the example image, the data item indicative of ROIs indexed represents the location in the image of only one region of interest.

However, as explained later in the description, the invention also applies to the case where any number of regions of interest have been defined in the stored images and in the example image.

Moreover, for reasons of simplifying the description of the invention, it is assumed that the example image and the stored images all have the same size.

However, the invention also applies to the case where the images are of different sizes. In this eventuality, it is necessary to ensure that the image division grid (illustrated in FIG. 8) is the same for the example image as for the stored images, for calculating the associated index.

In FIG. 4, the similarity calculation method begins with a step S410 of initialising variables used by the method, notably:

a counter i initialised to 1;
variables $W_1$ to $W_N$ initialised to zero, which corresponds to weighting coefficients participating in the calculation of similarity;
a variable INTER initialised to zero, this variable will contain an intermediate result for calculating the similarity;
a variable SIM initialised to zero and intended to receive the final result of the similarity calculation.

This initialisation step is followed by two steps performed in parallel, steps S412 and S414, in which there are recovered respectively the index of the example image Q, denoted Index(Q), and the index of an image D stored in the database, denoted Index(D). As mentioned before, each of the two indexes comprises a vector of N components (G(Q), G(D), each of the components being a histogram of colours, and a data item indicative of ROIs (ROI(Q), ROI(D)).

The indexes of the stored image under consideration and of the example image are recovered in the image data storage unit 20, where they were previously stored (FIG. 2, steps S2 to S4).

At the following step S416, a block $B_i$ of each of the images (Q and D) is selected, commencing with the block $B_1$, since the counter i was previously initialised to the value 1 (step S410). "Selecting" the block $B_i$ means here considering for each of the example and stored images, the location, in terms of 2D coordinates, of the block under consideration in the image plane corresponding to each of the images.

Thus, having selected the block $B_i$, the following step S418 is passed to, in which there is calculated the intersection, in terms of surface area, between the block ($B_i$) under consideration, the region of interest indexed to the example image (ROI(Q)), and the one indexed to the stored image under consideration (ROI(D)). The value of this intersection is denoted "INTER".

The following step S420 is a decision step in which it is determined whether or not the intersection surface INTER calculated at the previous step is zero.

In the affirmative, the coefficient $W_i$ corresponding to the selected block $B_i$ keeps (step S422) the value zero initialised at step S420. According to a variant embodiment of the invention, the value attributed to $W_i$ at step S422 can be chosen suitably so as to be different from zero.

In the negative, step S424 is passed to, in which there is allocated to the coefficient $W_i$ the value obtained by the ratio between the surface area INTER calculated previously and the total surface area of the current block $B_i$ (SURFACE ($B_i$)).

At the following step S426, the counter i is incremented. The following step S428 is a decision step in which it is determined whether or not the counter i is strictly greater than the number N of blocks defined in the images.

In the negative, step S416 is performed once again in order to select the next block and to calculate (S418) as before the surface area of the intersection INTER associated with this block and to allocate accordingly a value to the corresponding coefficient $W_i$ (steps S420, S422, S424). The counter i is next once again incremented (S426) and tested (S428).

Returning to step S428, if the counter i is strictly greater than the number N of blocks, this means that the last block which was selected is the block $B_N$. Consequently all the blocks in the image plane have been processed.

Step S430 is then passed to, in which there is determined a similarity value, allocated to the variable SIM, between the example image Q and the stored image D under consideration, in accordance with the following formula:

$$SIM = \frac{\sum_{i=1}^{N} W_i dist(q_i, d_i)}{\sum_{i=1}^{N} W_i} \quad (1)$$

in which $q_i$ and $d_i$ designate respectively any component, corresponding to the same block $B_i$, of the vector G(Q) associated with the image Q and of the vector G(D) associated with the image D, and $dist(q_i, d_i)$ designates a measurement of similarity between two histograms of colours.

In a preferred embodiment of the invention, the measurement used is the intersection between histograms known from the state of the art. In order to obtain more details on the intersection between histograms, reference can for example be made to the article by M. J. Swain and D. H. Ballard, entitled "Color Indexing", International Journal of Computer Vision, 7:1, 1991.

Comparing the distribution of the colours in each block of the example image and of the stored image under consideration, makes it possible to increase the precision of the image search, compared with the use of another descriptor such as texture.

Finally, at step S432, the similarity value (SIM) between the example image and the stored image under consideration is saved in the image data storage unit 20 in order to be used subsequently during the step, described previously in relation to FIG. 2 (step S6), of sorting/selection of the stored images as a function of their degree of similarity with the example image.

The similarity calculation process described above in relation to FIG. 4 is recommenced for each stored image to be compared with the example image.

Thus, for each stored image to be compared with the example image, a similarity value is obtained whose calculation takes into account the content data (histograms of colours) and the data indicative of regions of interest associated respectively with the example image and with the stored image.

In general terms, it can be stated that the calculation of the similarity (SIM) between the example image and a stored image is effected by calculating a distance between the vector G(Q) associated with the example image and the vector G(D) associated with the stored image under consideration. This distance is weighted by means of the N weighting coefficients $W_i$, the value of each of which being indicative of a degree of proximity in one of the blocks $B_i$, of regions of interest associated with the example image and with the stored image under consideration.

Thus, through the simple calculation of these weighting coefficients ($W_i$), a taking into account of regions of interest is reflected in the calculation of the similarity between the example image and an image in the database.

According to the preferred embodiment of the invention the weighting coefficients $W_i$ have a value which is a function of the surface area of the intersection between the regions of interest associated with the example image, those associated with the stored image under consideration, and the block under consideration of the image plane of the example image and of the stored image under consideration.

More precisely, the similarity value (SIM) defined previously (Formula (1)) is the result of the sum of values, each of which being obtained by calculating the intersection between the histogram of colours associated with a given block of the example image and the one associated with the same block of the stored image under consideration. Each intersection value is weighted in accordance with the invention by a weighting coefficient $W_i$, whose value is indicative of a "proximity" in the block under consideration $B_i$ of the image plane, of the regions of interest associated with the example image and those associated with the stored image.

Thus, the proximity between the regions of interest of the example image and of the stored image under consideration within a block of the image plane is precisely evaluated.

The greater this "proximity", the greater the value of the weighting coefficients ($W_i$), and therefore the greater the similarity value (SIM) obtained, for a constant value of the intersection between the components (histograms) of the content data.

This is because, the greater the value of the intersection surface area INTER, the greater the corresponding weighting coefficient $W_i$. It can be remarked that, for a given block $B_i$, the value of the weighting coefficient $W_i$ is between zero and 1 (when INTER is equal to the surface area of $B_i$).

Moreover, as can be seen in Formula (1) above, the similarity value (SIM) is standardised to 1 by dividing the weighted sum of the intersections of histograms by the sum of the weighting coefficients.

Moreover, the larger the number N of division blocks of an image, the greater the granularity of calculation of the "proximity" of the regions, and therefore the same applies to the precision of the value of the similarity calculated.

In accordance with the invention, the similarity calculation method described above in relation to FIG. 4 can be extended to the case where there exists any number of regions of interest defined in the example image and in the images stored in the database.

Let it be assumed that the example image Q contains a number R (R is any integer) of regions of interest: $ROI_r(Q)$ with $r \in \{1, 2, \ldots, R\}$; and the stored image under consideration D comprises a number T thereof (T is any integer): $ROI_t(D)$ with $t \in \{1, 2, \ldots, T\}$.

Then the general formula for determining the weighting coefficients $W_i$ is as follows:

$$W_i = \sum_{t=1}^{T} \sum_{r=1}^{R} P_i^{r,t} \quad (2)$$

with $$P_i^{r,t} = \frac{area(B_i \cap ROI_r(Q) \cap ROI_t(D))}{area(B_i)}$$

In conclusion, it can be stated that the comparison of descriptors of the visual content of the images (example and stored), such that the distribution of the colours, within a given block of these images, associated with the evaluation of a proximity of regions of interest defined in these images, by virtue of the calculation of the above-mentioned weighting coefficients, confers on the image search method of the invention a precision and efficacy unknown up till now in the image search techniques of the prior art.

Figure 5:
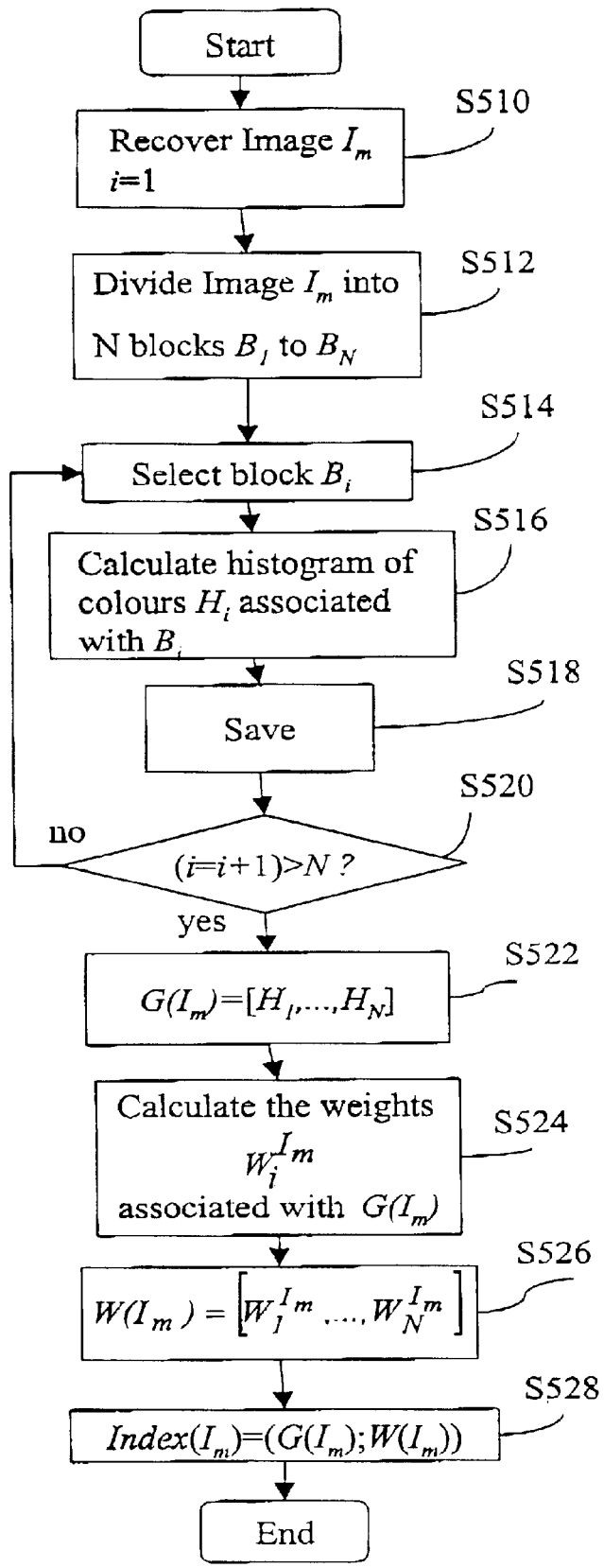
FIG. 5 depicts a flow diagram illustrating the method of indexing an image from an item of information representing the visual content of the image and weighting coefficients associated by block of the image taking into account the presence of regions of interest, according to a preferred embodiment of the second aspect of the invention.

With reference now to FIG. 5, a description will be given of a method of indexing an image from an item of information representing the visual content of the image and weighting coefficients associated by block of the image taking into account the presence of regions of interest, according to a preferred embodiment of the second aspect of the invention.

The indexing method depicted in FIG. 5 is used both for extracting the content data item during the indexing of an image which is to be stored in the database and for extracting the content data item of an example image when this is supplied externally to the database by the user. In the first case, the operation is performed by the stored image index recovery/extraction unit 40. In the latter case, the extraction of the content data item is performed by the example image index recovery/extraction unit 50.

The extraction method depicted in FIG. 5 starts with step S510 in which the image Im to be processed is recovered. If it is a case of the example image, this can be recovered in the form of a bitmap representation stored previously in the image data storage unit 20. As a variant, the image can be recovered in the form of a compressed image. Following Step S512, the recovered image Im is divided in accordance with a partitioning of N (N is an integer) blocks $B_1$ to $B_N$.

It should be stated here that the term "partitioning" should be understood here in its mathematical sense, which is given below.

A partitioning of a set is a division of this set into nonempty parts in disconnected pairs, and whose combination is equal to the whole.

In a preferred embodiment of the invention, the image to be processed is divided in accordance with a rectangular grid into 16 blocks (N=16), as illustrated in FIG. 8, in which an image to be indexed 2 is divided into 16 blocks with the same surface area $B_1$ to $B_{16}$. As explained below in relation to FIG. 5, each of the blocks making up the image is considered one after the other, in order to extract therefrom information representing the visual content of this block.

Returning to FIG. 5, once the image to be processed has been divided into N blocks (step S512), at the following step S514, a block of the image $B_i$ is selected. As the counter i has previously been initialised to 1 (step S510), the first action is to select the block $B_1$ (i=1).

At the following step S516, the histogram of colours $H_i$ associated with the block $B_i$ selected is calculated.

The method used in the context of the present invention for calculating a histogram of colours from an image is known from the state of the art. It is possible, in order to obtain more details on the indexing of an image based on the colour, to refer for example to the article by M. J. Swain and D. H. Ballard, entitled "Color Indexing", International Journal of Computer Vision, 7:1, 1991.

At the following step S518, the histogram of colours calculated at the previous step (S516) for the block of the image selected, is saved in the image data storage unit 20.

The step S520 which follows is a decision step in which first of all a counter i is incremented and it is next determined whether or not the value of i is strictly greater than the number N of blocks issuing from the division of the image.

In the negative, step S512 is performed again in order to select the next block of the image in order to calculate the corresponding histogram of colours thereof (steps S516 and S518), and the counter i is then once again incremented and tested (S520).

If the counter i is strictly greater than the number N of blocks, this means that the last block selected is the block $B_N$. Consequently all the blocks of the image have been processed. In this case, step S522 is passed to, in which all the calculated histograms of colours corresponding to the different blocks of the image Im are grouped together in a vector of N components:

$$G(Im)=[H_1, \ldots, H_N].$$

Each of the components $H_i$ of the vector G(Im) corresponds to the histogram of colours calculated for the block $B_i$ of the image.

It should be noted that, if C designates the total number of colours available (palette of colours), each histogram $H_i$ includes C elements.

It can also be noted that, although in the preferred embodiment of the invention, the space of the colours used is the RGB space, any other space, for example the HSV space, can also be used, The vector G(Im) associated with the image Im constitutes the "content data" or "data of the first type", representing at least one characteristic of the visual content of the image. The characteristic of the visual content of the image consists, in accordance with a preferred embodiment of the invention, of all the distributions of colours (histograms) associated with the blocks of the image.

Returning to FIG. 5, at the following step S524, a calculation is carried out of the weighting coefficients $W_i^{Im}$ or weight allocated to each of the histograms of the vector G(Im) calculated previously, and which will be used in the similarity calculation described below in relation to FIG. 7. These weighting coefficients, whose calculation will be detailed below in relation to FIG. 6, take into account the location of the regions of interest in the image under consideration.

At step S626, the weighting coefficients are saved in the form of a vector W(Im), each component $W_{iIm}$ of which is the weight associated with the corresponding component $H_i$ of the vector of the histograms G(Im) associated with the image.

At the final step S528, the index denoted Index(Im) and composed of the vectors G(Im) and W(Im) previously calculated is associated with the image under consideration (Im).

Consequently the index of any image Im issuing from the database or input as an example image, once this index has been recovered or extracted, consists of the vector G(Im) defined above, and the vector W(Im) of the weighting coefficients.

Thus the index associated with any image Im can be denoted Index(Im), in the following manner:

$$\text{Index}(Im)=(G(Im); W(Im)).$$

It should be noted that hereinafter, in order to simplify the notations, ROI(Im) will be used to designate indifferently one or more regions of interest associated with the image Im or the data item indicating the location of region or regions of interest in the image.

Figure 6:
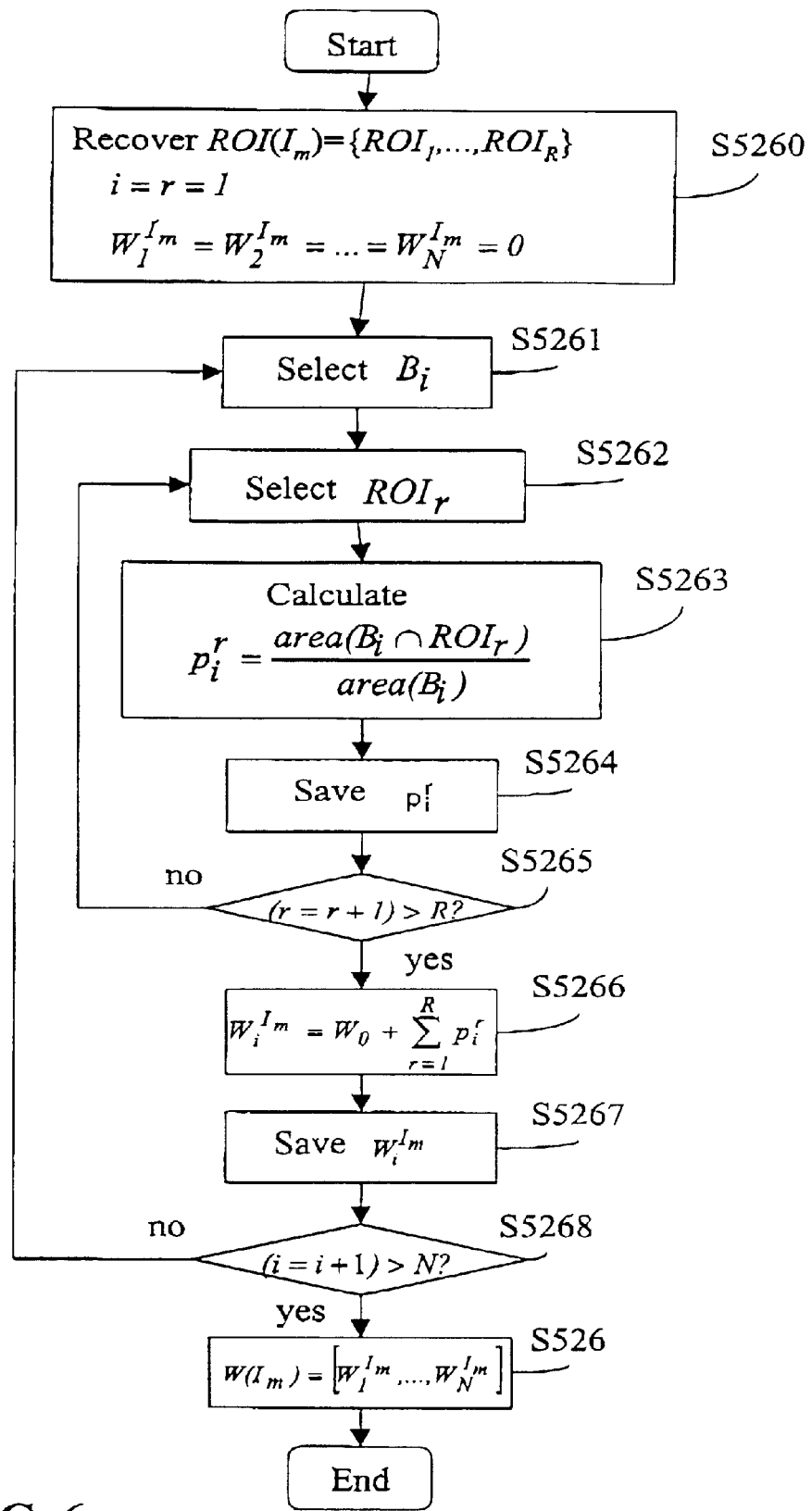
FIG. 6 depicts a flow diagram detailing the calculation of the weighting coefficients of the method of indexing an image illustrated in FIG. 5.

With reference now to FIG. 6, the step (S524) of calculating the weighting coefficients $W_i^{Im}$ of FIG. 5 will now be detailed.

Let it be supposed that the image Im, which can be the example image or any image in the database, has a number R (R is any integer) of regions of interest: $ROI_r$ with $r \in \{1, 2, \ldots, R\}$. This therefore gives: $ROI(Im)=\{ROI_1, ROI_2, \ldots, ROI_R\}$.

In FIG. 6, the method of calculating the weighting coefficients begins with an initialisation step S5260 in which first of all the data indicating the location of a region of interest ROI(Im) associated with the image Im under consideration is recovered. Next variables used by the method are initialised, notably:

two counters i and r which are initialised to 1, variables $W_i^{Im}$ to $W_N^{Im}$ initialised to zero, which are intended to receive the calculated values of the weighting coefficients.

At the following step S5261, a block $B_i$ of the image Im is selected, commencing with the block $B_1$, since the counter i was previously initialised to the value 1 (step S5260). "Selecting" the block $B_i$ means here considering for the image Im under consideration the location in terms of 2D coordinates of the block under consideration in the image plane corresponding to this image.

At the following step, a region of interest $ROI_r$ of the image Im is selected, commencing with the one referenced $ROI_1$, since the counter r was previously initialised to the value 1 (step S5260).

At the following step S5263, the ratio ($P_i^r$) between the surface area of the intersection between the block $B_i$ and the region of interest $ROI_r$ selected, and the surface area of the block $B_i$, is calculated in accordance with the following formula:

$$P_i^r = \frac{area(B_i \cap ROI_r)}{area(B_i)} \quad (3)$$

In this way, through this simple calculation, the value of each coefficient $P_i^r$ thus obtained makes it possible to quantify the importance to be given to each block of the image during a calculation of similarity between an example image and an image stored in a database.

The following step (S5264) is a step of temporary saving of the value of the ratio $P_i^r$ which has just been calculated.

The following step S5265 is a decision step in which first of all the counter r is incremented and next it is determined whether or not the value of r is strictly greater than the number R of regions of interest defined in the image Im.

In the negative, this means that all the regions of interest of the image Im have not yet been taken into account. In this case, step S5262 is returned to in order to select another region of interest corresponding to the new counter value r, and steps S5263 to S5265 are recommenced as explained previously.

Returning to step S5265, if the value of the counter r is tested strictly greater than the number R of regions of interest defined for the image Im, this means that the region of interest selected was $ROI_R$.

Step S5266 is then passed to, in which the value of the weighting coefficient $W_i^{Im}$ of the image Im corresponding to the selected block i is calculated.

For this purpose, all the ratios $P_i^r$ previously saved (S5264) each corresponding to a region of interest of the image are summed. To this sum the predefined value of a predefined constant $W_0$, which would be the default value of the coefficients $W_i^{Im}$ if no region of interest were defined in the image, is added. In the preferred embodiment of the invention, the value of $W_0$ is chosen so as to be equal to one.

Thus the value of the weighting coefficient $W_i^{Im}$ corresponding to the current block $B_i$ (selected) is obtained by means of the following formula:

$$W_i^{Im} = W_o + \sum_{r=1}^{R} P_i^r \quad (4)$$

NB:

Each ratio $P_i^r$ can take a value lying between zero, when the intersection between $B_i$ and $ROI_r$ is the empty set, and 1, when this intersection is equal to $B_i$.

Consequently each weighting coefficient $W_i^{Im}$ can take a value of between $W_0$ and $(W_0+R)$.

In this way, the coefficients $W_i^{Im}$ thus calculated per image block take into account both the global content or the "background" content of the image by means of the coefficient $W_0$ (without consideration of regions of interest) and the specific content of these regions of interest by means of the sum of the coefficients $P_i^r$ calculated from the same block. By then causing the coefficient $W_0$ to vary it is then possible to modify the magnitude of the content of the background of the image compared with that of the regions of interest.

Returning to FIG. 5, after having calculated a weighting coefficient $W_i^{Im}$ (S5266), its value is saved (step S5267).

The following step S5268 is a decision step in which first of all the counter i is incremented and next it is determined whether or not the value of i is strictly greater than the number N of blocks resulting from the division of the image plane of the image Im.

In the negative, this means that all the blocks $B_i$ associated with the image Im have not yet been taken into account. In this case, step S5261 is returned to in order to select another block corresponding to the new counter value i, and steps S5262 to S5268 are recommenced as explained previously.

Returning to step S5268, if the value of the counter i is tested strictly greater than the number N of blocks divided in the image plane of the image Im, this means that the last block selected was the block $B_N$.

The final step S526 is then passed to, in which, as previously mentioned in relation to FIG. 5, the weighting coefficients are saved in the form of a vector W(Im), each component $W_i^{Im}$ of which is the weighting coefficient associated with the corresponding component, that is to say with the same rank or associated with the same block of the image plane, of the vector G(Im) associated with the image.

It should be stated here that each component of the vector G(Im) is the data item representing the visual content of a block of the image. This data item being a histogram of colours in the preferred embodiment of the invention.

Thus it can be stated that each coefficient $P_i^r$ calculated (step (S5263) indicates a degree of "presence" of the corresponding region of interest $ROI_r$ in the block $B_i$ under consideration of the image plane of the image Im.

It can therefore also be stated that each coefficient $W_i^{Im}$ is indicative of a degree of presence in the block $B_i$ under consideration of the image, of the regions or regions of interest defined for this image.

Figure 7:
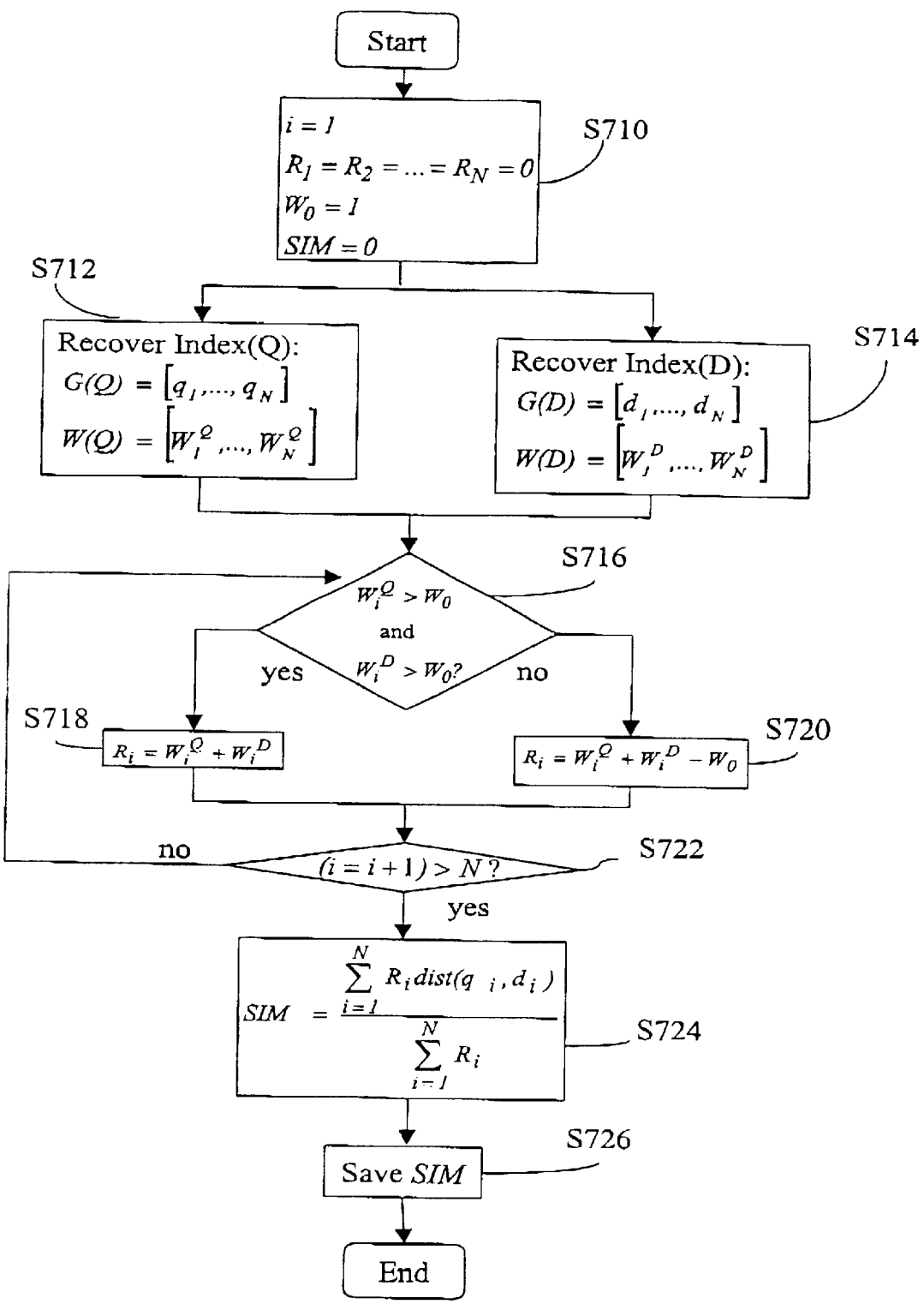
FIG. 7 depicts a flow diagram illustrating a method of calculating the similarity between an example image and an image in the database according to a preferred embodiment of the second aspect of the invention.

With reference to FIG. 7, a description will now be given of the method of calculating the similarity between an example image and an image in the database according to a preferred embodiment of the second aspect of the invention. The flow diagram in FIG. 7 details step S5 of FIG. 2 previously described.

For reasons of simplification of the disclosure of the invention, it is assumed that the example image and the stored images all have the same size.

However, the invention also applies to the case where the images are of different sizes. In this eventuality, it is necessary to ensure that the division grid of the image (illustrated In FIG. 8) is the same for the example image and for the stored images, for calculating the associated index.

In FIG. 7, the similarity calculation method begins with a step S710 of initialising variables used by the method, notably:

a counter i initialised to 1;

a variable SIM initialised to zero and intended to receive the final result of the similarity calculation;

variables $R_1$ to $R_N$ initialised to zero, which correspond to the definitive weighting coefficients (results) participating in the calculation of similarity.

This initialisation step is followed by two steps performed in parallel, steps S712 and S714, in which there are recovered respectively the index of the example image Q, denoted Index(Q), and the index of an image D stored in the database, denoted Index(D). As mentioned before, each of the two indexes includes a vector (G(Q), G(D)) with N components, each of the components being a histogram of colours, and a vector (W(Q), W(D)) of weighting coefficients calculated in accordance with the method described in FIG. 6. This gives:

$$W(Q)=[W_1^Q, \ldots, W_N^Q] \text{ and } W(D)=[W_1^D, \ldots, W_N^D]$$

N being the number of blocks resulting from the division of the image plane of each of the images.

The indexes of the stored image under consideration and of the example image are recovered in the image data storage unit 20, where they were previously stored (FIG. 2, steps S2 to S4).

The following step is a decision step in which the weighting coefficients $W_i^Q$, $W_i^D$ associated with the images Q and D corresponding to the block $B_i$ are considered, commencing with those corresponding to the block $B_1$ (following the value of the counter i initialised to 1). It is then determined whether the current coefficients $W_i^Q$ and $W_i^D$ are simultaneously strictly greater than the default value $W_0$.

In the affirmative, step S718 is passed to, in which the sum of these coefficients is allocated to the result weighting coefficient $R_i$ corresponding to the current block $B_i$:

$$R_i = W_i^Q + W_i^D$$

Conversely, in the negative, step S720 is passed to, in which the sum of the coefficients of the images Q and D minus the value of $W_0$ is allocated to the result weighting coefficient $R_i$ corresponding to the current block $B_i$:

$$R_i = W_i^Q + W_i^D - W_0$$

Thus:

if $W_i^Q = W_i^D = W_0$ then $R_i = W_0$;

if $W_i^Q = W_0$ and $W_i^D$ is different from $W_0$, then $R_i = W_i^D$;

if $W_i^D = W_0$ and $W_i^Q$ is different from $W_0$, then $R_i = W_i^Q$;

Thus the coefficients $R_i$ are obtained by a simple calculation which is inexpensive in terms of computer resources used, whose value thus obtained is indicative of a degree of simultaneous presence, in a block under consideration, of regions of interest in the example image and the stored image under consideration.

Returning to FIG. 7, step S722 which follows is a decision step in which first of all the counter i is incremented and next it is determined whether or not the value of i is strictly greater than the number N of blocks resulting from the division of the image plane of the images Q and D.

In the negative, this means that all the blocks $B_i$ associated with the images have not yet been taken into account. In this case, step S716 is returned to in order to test the following coefficients $W_i^Q$, $W_i^D$ followed by step S718 or step S720 as before.

Returning to step S722, if the counter i is strictly greater than the number N of blocks, this means that the last coefficients which were selected correspond to the block $B_N$. Consequently, all the result coefficients $R_i$ have been calculated.

Step S724 is then passed to, in which a similarity value, allocated to the variable SIM, is determined between the example image Q and the stored image D under consideration, in accordance with the following formula:

$$SIM = \frac{\sum_{i=1}^{N} R_i dist(q_i, d_i)}{\sum_{i=1}^{N} R_i} \quad (5)$$

in which $q_i$ and $d_i$ designate respectively any component, corresponding to the same block $B_i$, of the vector G(Q) associated with the image Q and the vector G(D) associated with the image D, and $dist(q_i, d_i)$ designates a measurement of similarity between these two components.

In the preferred embodiment of the invention, in which these components are histograms of colours, the measurement used is the intersection between known histograms of the state of the art. In order to obtain more details on intersection between histograms, reference can be made for example to the article by M. J. Swain and D. H. Ballard, entitled "Color Indexing". International Journal of Computer Vision, 7:1, 1991.

Finally, at step S726, the similarity value (SIM) between the example image and the stored image under consideration is saved in the image data storage unit 20 in order to be used subsequently during the step, described previously in relation to FIG. 2 (step S6), of sorting/selection of the images stored as a function of their degree of similarity to the example image.

The similarity calculation process described above in relation to FIG. 7 is recommenced for each stored image to be compared with the example image.

Thus, for each stored image to be compared with the example image, a similarity value is obtained whose calculation takes into account the content data (histograms of colours) and the data indicative of the regions of interest associated respectively with the example image and with the stored image.

In general terms, it can be stated that the calculation of the similarity (SIM) between the example image and a stored image is effected by the calculation of a distance between the vector G(Q) associated with the example image and the vector G(D) associated with the stored image under consideration. This distance is weighted by means of the N weighting coefficients $R_i$, the value of each of which is indicative of a degree of presence in one of the blocks $B_i$, of regions of interest associated with the example image and with the stored image under consideration.

This calculation of distance between vectors affords a use, which is simple and inexpensive in terms of calculation time, of the calculation of similarity between the example image and a stored image.

More precisely, the similarity value (SIM) defined previously (Formula (5)) is the result of the sum of values, each of which being obtained by the calculation of the intersection between the histogram of colours associated with a given block of the example image and the one associated with the same block of the stored image under consideration. Each intersection value is multiplied in accordance with the invention by a weighting coefficient $R_i$, whose value weights the importance of the content (the distribution of the colours) of the block under consideration of the example image and of the stored image under consideration, as a function of the regions of interest present in these images.

Moreover, as can be seen in Formula (5) above, the similarity value (SIM) is standardised to 1 by dividing the weighted sum of the similarity measurements $dist(q_i, d_i)$ by the sum of the result weighting coefficients.

In addition, the greater the number N of image division blocks, the more precise the evaluation of a degree of presence of regions of interest in these blocks, and therefore the same applies to the precision of the value of the similarity calculated. The measurement of similarity thus obtained supplies a search result which has great precision.

Figure 9:
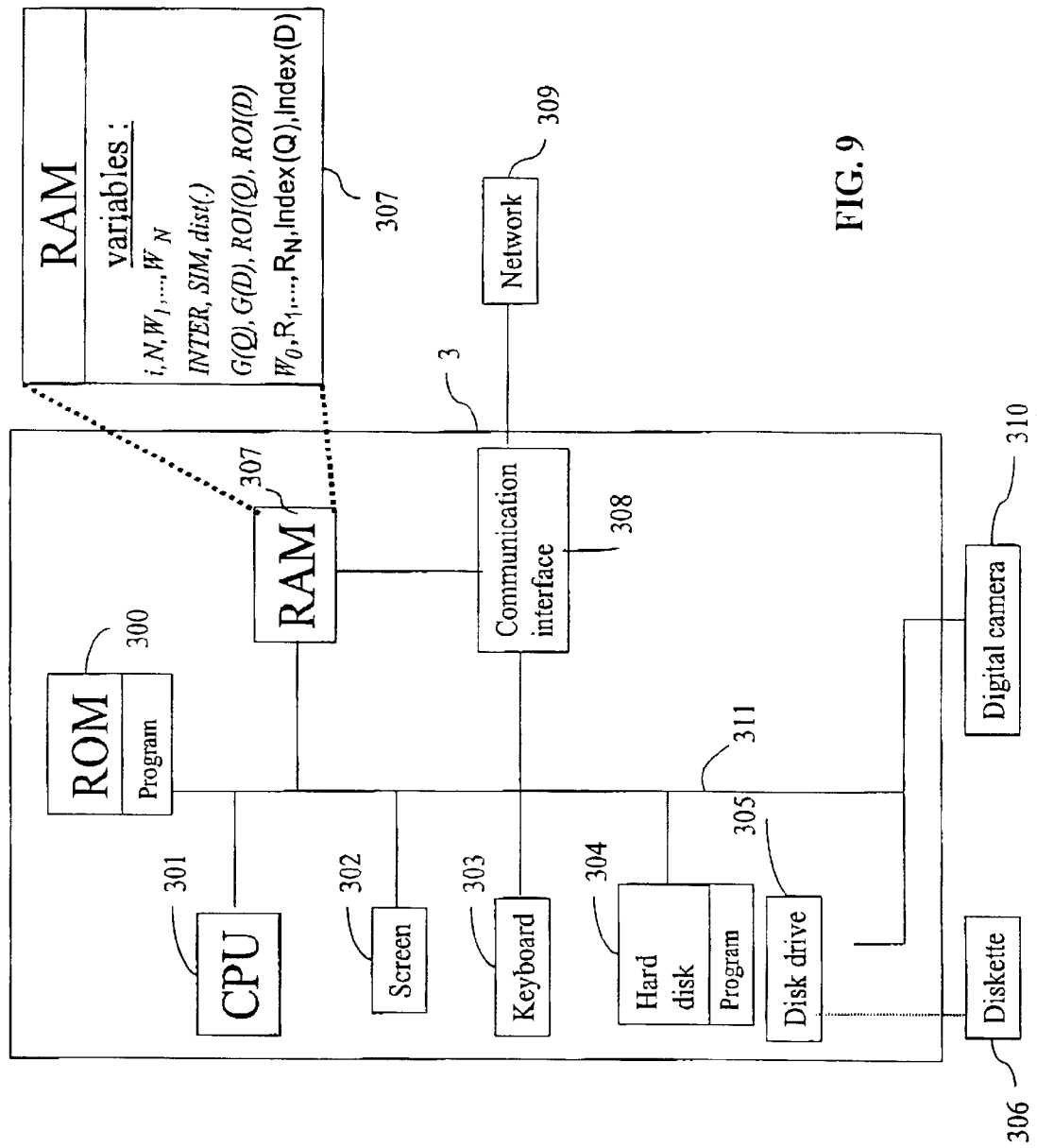
FIG. 9 depicts schematically a computer adapted to implement the methods of indexing and/or seeking images in accordance with the present invention.

With reference now to FIG. 9, a description will be given of a computer adapted to implement the image indexing and/or search methods in accordance with the present invention and described previously in relation to FIGS. 2 to 8. It should be noted that the computer illustrated in FIG. 9 is a particular preferred embodiment of the general device described previously in relation to FIG. 1.

In this embodiment, the indexing and image search methods according to the invention are implemented in the form of computer programs. These programs include one or more sequences of instructions whose execution by said computer enables the steps of the image indexing and search methods to be implemented in accordance with the invention.

In FIG. 9, the computer 3, which can typically be a microcomputer or a workstation, is connected to different peripherals, for example a digital camera 310 or any other image acquisition or storage device, such as a scanner, supplying information (images, video) to be indexed to the computer 3. These images can be stored in the storage means available to the computer, such as a hard disk 304.

The computer 3 also has a communication interface 308 connected to a communication network 309, for example the Internet, able to transmit to the computer digital information to be indexed.

The computer 3 also has data storage means such as a hard disk 304, or a disk drive 305 for writing data to a diskette 305 and reading these data. The computer can also have a compact disc (CD ROM) drive (not shown) on which the images in the database can be stored, as well as a computer card reader (PC card) (not shown).

According to a preferred embodiment of the invention, the executable code of the programs for implementing the indexing and image search methods according to the invention is stored in the hard disk 304.

According to a variant embodiment, the executable code of these programs is stored in a read only memory 300 (ROM) of the computer.

According to a second variant embodiment, the executable code of the program or programs can be downloaded from the communication network 309 via the communication interface 308 in order to be stored on the hard disk 304.

The computer 3 also has a screen 302 for displaying the images to be indexed or which have been indexed and serving as a graphical interface with the user to enable him notably to define an example image and to define regions of interest, using a pointing device (not shown) such as a mouse or optical pencil, and a keyboard 303.

The computer has a central processing unit (CPU) 301, for example a microprocessor, which controls and directs the execution of the instructions of the program or programs of the invention stored in the read only memory 300 or in the hard disk 304. The central processing unit 301 fulfils the function of the control unit 80 described above in relation to FIG. 1.

The computer also has a random access memory 307 (RAM) containing registers intended to store the variables created and modified during the execution of the program, notably the variables mentioned above in relation to the description of FIGS. 4, 6 and 7, as can be seen in the enlarged representation of the RAM in FIG. 9.

Finally, the computer has a communication bus 311 affording communication and interoperability between the different aforementioned units making up the computer 3.

Naturally, numerous modifications can be made to the embodiments of the invention described above without departing from the scope of the invention.

What is claimed is:

1. A method of searching images, from an example image, from amongst a plurality of images stored in a database, each of the stored images being associated with a data item of a first type representing at least one characteristic of the visual content of the image, each of the stored images being associated with a data item of a second type representing a location of at least one region of interest in the image, said method comprising the following steps:

receiving a data item of the second type representing the location of at least one region of interest in the example image;

receiving a data item of the first type associated with the example image, the data item of the first type being obtained for each of the stored images and for the example image by performing a first operation of dividing the image into a predefined number N of blocks followed by a second extraction operation for each of the blocks ($B_i$) of a data item representing a visual content of the block, the data item of the first type including of a vector (G(Im)) having N components each of which corresponds to a data item representing a visual content extracted for a block of the image;

calculating a similarity between the example image and each image in at least one subset of the stored images, the similarity being calculated from the data of the first type and of the second type associated respectively with the example image and with a stored image;

said step of calculating a similarity, denoted SIM, between the example image, denoted Q, and each image, denoted D, from the least one subset of stored images being performed by calculating a distance between a vector G(Q) associated with the example image and a vector G(D) associated with the stored image under consideration, the distance being weighted by means of a plurality N of weighting coefficients $W_i$, a value of each of which is indicative of a degree of proximity in one of the blocks $B_i$ resulting from the division of the images, of regions of interest associated with the example image and with the stored image under consideration; and supplying at least one image, referred to as a result image, of the database, the at least one result image being selected from amongst the stored images in the database according to its degree of similarity with the example image.

2. An image search method according to claim 1, wherein said step of calculating a similarity SIM is effected by calculating a sum of values, each of which, denoted dist($q_i$, $d_i$), being a measure of similarity between a component $q_i$ of the vector G(Q) corresponding to a given block $B_i$ of the example image and the component $d_i$ of the vector G(D) corresponding to the same block of the stored image under consideration, the similarity measurements dist($q_i$, $d_i$) being weighted by the weighting coefficients $W_i$ having a value indicative of a degree of proximity, in the block, of regions of interest associated with the example image and with the stored image under consideration.

3. An image search method according to claim 2, wherein the similarity SIM is obtained by means of the following formula:

$$SIM = \frac{\sum_{i=1}^{N} W_i dist(qi, di)}{\sum_{i=1}^{N} W_i}.$$

4. An image search method according to claim 1, wherein the weighting coefficients $W_i$ have a value which is a function of a surface area of an intersection between regions of interest associated with the example image, the regions of interest associated with the stored image under consideration, and the block under consideration of the example image and of the stored image under consideration.

5. An image search method according to claim 4, in which the example image Q contains any integer number R of regions of interest, denoted $ROI_r(Q)$, r being an integer between 1 and R, and the stored image under consideration D contains any integer number T of regions of interest, denoted $ROI_t(D)$, t being an integer between 1 and T, in which each of the weighting coefficients $W_i$ is obtained in accordance with the following formula:

$$W_i = \sum_{t=1}^{T} \sum_{r=1}^{R} P_i^{r,t}$$

with $$P_i^{r,t} = \frac{area(B_i \cap ROI_r(Q) \cap ROI_t(D))}{area(B_i)}$$

the index i being an integer number between 1 and the predefined number N of blocks.

6. An image search method according to claim 1, wherein the data item representing the visual content of a block of the image represents a distribution of colors ($H_i$) in the block.

7. An image search method according to claim 6, wherein each measurement of similarity dist($q_i$, $d_i$) between a component $d_i$ of the vector G(Q), corresponding to a given block $B_i$ of the example image and the component $d_i$ of the vector G(D) corresponding to the same block of the stored image under consideration, is obtained by calculating an intersection between these two components.

8. An image search method according to claim 1, wherein the data item of the second type representing the location of at least one region of interest in each of the stored images and in the example image includes a set of two-dimensional points indicative of a shape of the at least one region of interest and its location in an image plane of the image.

9. An image search method according to claim 1, wherein the predefined number N of blocks is equal to sixteen.

10. A method of indexing digital images, comprising the following steps, for each image Im to be indexed:

dividing an image plane of the image Im, in accordance with a partitioning comprising a predefined number N of blocks $B_i$;

extracting from each of the blocks a data item of a first type representing at least one characteristic of a visual content of the block;

defining in the image at least one region of interest, and obtaining a data item of a second type representing a location of at least one region of interest in the image;

calculating for each of the blocks $B_i$ a first coefficient, $W_i^{Im}$, indicating a degree of presence in the block $B_i$ under consideration of the image of the at least one region of interest;

associating with the image Im an index composed of a first vector G(Im), having N components, each of which is one of the data items of the first type, and a second vector W(Im), having N components, each of which is one of the first coefficients $W_i^{Im}$, in which the image Im contains any integer number R of regions of interest, denoted $ROI_r$, r being an integer between 1 and R, and wherein in said step of calculating a first coefficient for each of the blocks $B_i$, the first coefficient $W_i^{Im}$ is obtained by means of the following formula:

$$W_i^{Im} = W_o + \sum_{r=1}^{R} P_i^r$$

in which $W_0$ is a predefined constant, and $P_i^r$ is a coefficient indicating a degree of presence of a corresponding region of interest $ROI_r$, in the block $B_i$ under consideration of the image plane of the image Im.

11. An image indexing method according to claim 10, wherein each coefficient $P_i^r$ is obtained by calculating a ratio between a surface area of an intersection between the block $B_i$ under consideration and the corresponding region of interest $ROI_r$, and the surface area of the block $B_i$ under consideration.

12. An image indexing method according to claim 10, wherein the data item of the second type representing the location of the at least one region of interest in the image includes a set of two-dimensional points indicative of a shape of the at least one region of interest and its location in the image plane of the image.

13. An image indexing method according to claim 10, wherein the data item of the first type representing at least one characteristic of the visual content of a block of the image represents a distribution of colors in the block.

14. An image indexing method according to claim 10, wherein the image plane of the image Im is divided in accordance with a rectangular grid.

15. An image indexing method according to claim 14, wherein the predefined number N of blocks is equal to sixteen.

16. A method of searching images, from an example image, amongst a plurality of images stored in a database, wherein the example image and each of the stored images are indexed according to an image indexing method according to claim 10, comprising the following steps:

calculating a similarity SIM between the example image Q and each of the images D from amongst at least one subset of stored images, the similarity being calculated from first vectors G(Q), G(D), and second vectors W(Q), W(D), associated respectively with the example image Q and the stored image D, this step being performed by calculating a distance between the first vector G(Q) associated with the example image and the first vector G(D) associated with the stored image under consideration, the distance being weighted by means of a plurality N of weighting coefficients $R_i$, the value of each of which is calculated as a function of the components $W_i^Q$, $W_i^D$ of the second vectors W(Q) and W(D) associated respectively with the example image Q and the stored image D under consideration; and supplying at least one image, referred to as a result image, in the database, the at least one result image being selected from amongst the stored images in the database according to its degree of similarity with the example image.

17. An image search method according to claim 16, wherein a value of the weighting coefficients $R_i$ is obtained in accordance with the following formulae:

$R_i = W_i^Q + W_i^D$ if $W_i^Q$ and $W_i^D$ are both strictly greater than the predefined constant $W_0$ and $R_i = W_i^Q + W_i^D - W_0$ in other cases.

18. An image search method according to claim 16, wherein the similarity SIM is obtained by calculating a sum of values, each of which, denoted $dist(q_i, d_i)$, is a measurement of similarity between a component $q_i$ of the first vector G(Q) corresponding to a given block $B_i$ of the example image Q and the component $d_i$ of the first vector G(D) corresponding to the same block of the stored image D under consideration, these similarity measurements $dist(q_i, d_i)$ being weighted by the weighting coefficients $R_i$.

19. An image search method according to claim 18, wherein the similarity SIM is obtained by means of the following formula:

$$SIM = \frac{\sum_{i=1}^{N} R_i dist(qi, di)}{\sum_{i=1}^{N} R_i}.$$

20. An image search method according to claim 19, wherein each of the measurements of similarity, $dist(q_i, d_i)$, between a component $q_i$ of the vector G(Q) corresponding to a given block $B_i$ of the example image Q and the component $d_i$ of the vector G(D) corresponding to the same block in the stored image under consideration D, is obtained by calculating an intersection between these two components.

21. A device for searching for images, from an example image, from amongst a plurality of images stored in a database, said device comprising means adapted to implement each step of an image search method, said method being for searching images from an example image, from amongst a plurality of images stored in a database, each of the stored images being associated with a data item of a first type representing at least one characteristic of the visual content of the image, each of the stored images being associated with a data item of a second type representing a location of at least one region of interest in the image, said method comprising the following steps:

receiving a data item of the second type representing the location of at least one region of interest in the example image;

receiving a data item of the first type associated with the example image, the data item of the first type being obtained for each of the stored images and for the example image by performing a first operation of dividing the image into a predefined number N of blocks followed by a second extraction operation for each of the blocks ($B_i$) of a data item representing a visual content of the block, the data item of the first type including of a vector (G(Im)) having N components each of which corresponds to a data item representing a visual content extracted for a block of the image;

calculating a similarity between the example image and each image in at least one subset of the stored images, the similarity being calculated from the data of the first type and of the second type associated respectively with the example image and with a stored image, said step of calculating a similarity, denoted SIM, between the example image, denoted Q, and each image, denoted D, from the least one subset of stored images being performed by calculating a distance between a vector G(Q) associated with the example image and a vector G(D) associated with the stored image under consideration, the distance being weighted by means of a plurality N of weighting coefficients $W_i$, a value of each of which is indicative of a degree of proximity in one of the blocks $B_i$ resulting from the division of the images, of regions of interest associated with the example image and with the stored image under consideration; and supplying at least one image, referred to as a result image, of the database, the at least one result image being selected from amongst the stored images in the database according to its degree of similarity with the example image.

22. A device for searching images, from an example image, amongst a plurality of images stored in a database, said device comprising means adapted to implement each step of an image indexing method for indexing digital images, comprising the following steps, for each image Im to be indexed:

dividing an image plane of the image Im, in accordance with a partitioning comprising a predefined number N of blocks $B_i$;

extracting from each of the blocks a data item of a first type representing at least one characteristic of a visual content of the block;

defining in the image at least one region of interest, and obtaining a data item of a second type representing a location of at least one region of interest in the image;

calculating for each of the blocks $B_i$ a first coefficient, $W_i^{Im}$, indicating a degree of presence in the block $B_i$ under consideration of the image of the at least one region of interest;

associating with the image Im an index composed of a first vector G(Im), having N components, each of which is one of the data items of the first type, and a second vector W(Im), having N components, each of which is one of the first coefficients $W_i^{Im}$, in which the image Im contains any integer number R of regions of interest, denoted $ROI_r$, r being an integer between 1 and R, and wherein in said step of calculating a first coefficient for each of the blocks $B_i$, the first coefficient $W_i^{Im}$ is obtained by means of the following formula:

$$W_i^{Im} = W_o + \sum_{r=1}^{R} P_i^r$$

in which $W_0$ is a predefined constant, and $P_i^r$ is a coefficient indicating a degree of presence of a corresponding region of interest $ROI_r$, in the block $B_i$ under consideration of the image plane of the image Im.

23. A device for searching images, from an example image, amongst a plurality of images stored in a database, the images being indexed according to an indexing method comprising the following steps, for each image Im to be indexed:

dividing an image plane of the image Im, in accordance with a partitioning comprising a predefined number N of blocks $B_i$;

extracting from each of the blocks a data item of a first type representing at least one characteristic of a visual content of the block;

defining in the image at least one region of interest, and obtaining a data item of a second type representing a location of at least one region of interest in the image;

calculating for each of the blocks $B_i$ a first coefficient, $W_i^{Im}$, indicating a degree of presence in the block $B_i$ under consideration of the image of the at least one region of interest;

associating with the image Im an index composed of a first vector G(Im), having N components, each of which is one of the data items of the first type, and a second vector W(Im), having N components, each of which is one of the first coefficients $W_i^{Im}$, in which the image Im contains any integer number R of regions of interest, denoted $ROI_r$, r being an integer between 1 and R, and wherein in said step of calculating a first coefficient for each of the blocks $B_i$, the first coefficient $W_i^{Im}$ is obtained by means of the following formula:

$$W_i^{Im} = W_o + \sum_{r=1}^{R} P_i^r$$

in which $W_0$ is a predefined constant, and $P_i^r$ is a coefficient indicating a degree of presence of a corresponding region of interest $ROI_r$, in the block $B_i$ under consideration of the image plane of the image Im, said device comprising means adapted to implement each step of an image search method for searching images from the example image, amongst a plurality of images stored in a database, wherein the image searching method comprises the following steps:

calculating a similarity SIM between the example image Q and each of the images D from amongst at least one subset of stored images, the similarity being calculated from first vectors G(Q), G(D), and second vectors W(Q), W(D), associated respectively with the example image Q and the stored image D, this step being performed by calculating a distance between the first vector G(Q) associated with the example image and the first vector G(Q) associated with the stored image under consideration, the distance being weighted by means of a plurality N of weighting coefficients $R_i$, the value of each of which is calculated as a function of the components $W_i^Q$, $W_i^D$ of the second vectors W(Q) and W(D) associated respectively with the example image Q and the stored image D under consideration; and supplying at least one image, referred to as a result image, in the database, the at least one result image being selected from amongst the stored images in the database according to its degree of similarity with the example image.

24. A device for searching images, from an example image, from amongst a plurality of images stored in a database, each of the stored images being associated with a data item of a first type representing at least one characteristic of the visual content of the image, each of the stored images being associated with a data item of a second type representing the location of at least one region of interest in the image, said device comprising:

means for receiving a data item of the second type representing the location of at least one region of interest in the example image;

means for receiving a data item of the first type associated with the example image, the data item of the first type being obtained for each of the stored images and for the example image by performing a first operation of dividing the image into a predefined number N of blocks followed by a second extraction operation for each of the blocks ($B_i$) of a data item representing a visual content of the block, the data item of the first type including of a vector ($G(Im)$) having N components each of which corresponds to a data item representing a visual content extracted for a block of the image;

means for calculating a similarity between the example image and each of the images amongst at least one subset of the stored images, the similarity being calculated from the data of the first type and of the second type associated respectively with the example image and with a stored image, said means for calculating a similarity between the example image Q and each of the images D from amongst at least one subset of stored images including means for calculating a distance between the vector $G(Q)$ associated with the example image and the vector $G(D)$ associated with the stored image under consideration, the distance being weighted by means of a plurality N of weighting coefficients $W_i$, a value of each of which being indicative of a degree of proximity in one of the blocks $B_i$ resulting from the division of the images, of regions of interest associated with the example image and with the stored image under consideration; and means of supplying at least one image, referred to as a result image, of the database, the at least one result image being selected from amongst the stored images in the database according to its degree of similarity with the example image.

25. A device for indexing digital images, where an image Im to be indexed contains any integer number R of regions of interest, denoted $ROI_r$, r being an integer between 1 and R, said device comprising:

means for dividing the image plane of the image Im, in accordance with a partitioning comprising a predefined number N of blocks $B_i$;

means for extracting from each of the blocks a data item of a first type representing at least one characteristic of a visual content of the block;

means for defining in the image at least one region of interest, and obtaining a data item of a second type representing a location of at least one region of interest in the image;

means for calculating for each of the blocks $B_i$ a first coefficient, $W_i^{Im}$, indicating a degree of presence in the block $B_i$ under consideration of the image of the at least one region of interest, the first coefficient $W_i^{Im}$ being obtained by means of the following formula:

$$W_i^{Im} = W_o + \sum_{r=1}^{R} P_i^r$$

in which $W_0$ is a predefined constant, and $P_i^r$ is a coefficient indicating a degree of presence of a corresponding region of interest $ROI_r$, in the block $G_i$ under consideration of the image plane of the image Im; and means for associating with the image Im an index composed of a first vector $G(Im)$, having N components, each of which being one of the data items of the first type, and a second vector $W(Im)$, having N components, each of which being one of the first coefficients $W_i^{Im}$.

26. A computer, comprising means adapted to implement each step of an image search method, said method being for searching images from an example image, from amongst a plurality of images stored in a database, each of the stored images being associated with a data item of a first type representing at least one characteristic of the visual content of the image, each of the stored images being associated with a data item of a second type representing a location of at least one region of interest in the image, said method comprising the following steps:

receiving a data item of the second type representing the location of at least one region of interest in the example image;

receiving a data item of the first type associated with the example image, the data item of the first type being obtained for each of the stored images and for the example image by performing a first operation of dividing the image into a predefined number N of blocks followed by a second extraction operation for each of the blocks ($B_i$) of a data item representing a visual content of the block, the data item of the first type including of a vector ($G(Im)$) having N components each of which corresponds to a data item representing a visual content extracted for a block of the image;

calculating a similarity between the example image and each image in at least one subset of the stored images, the similarity being calculated from the data of the first type and of the second type associated respectively with the example image and with a stored image, said step of calculating a similarity, denoted SIM, between the example image, denoted Q, and each image, denoted D, from the least one subset of stored images being performed by calculating a distance between a vector $G(Q)$ associated with the example image and a vector $G(Q)$ associated with the stored image under consideration, the distance being weighted by means of a plurality N of weighting coefficients $W_i$, a value of each of which is indicative of a degree of proximity in one of the blocks $B_i$ resulting from the division of the images, of regions of interest associated with the example image and with the stored image under consideration; and supplying at least one image, referred to as a result image, of the database, the at least one result image being selected from amongst the stored images in the database according to its degree of similarity with the example image.

27. A computer, comprising an image search device for searching for images, from an example image, from amongst a plurality of images stored in a database, said device comprising means adapted to implement each step of an image search method, said method being for searching images from an example image, from amongst a plurality of images stored in a database, each of the stored images being associated with a data item of a first type representing at least one characteristic of the visual content of the image, each of the stored images being associated with a data item of a second type representing a location of at least one region of interest in the image, said method comprising the following steps:

receiving a data item of the second type representing the location of at least one region of interest in the example image;

receiving a data item of the first type associated with the example image, the data item of the first type being obtained for each of the stored images and for the example image by performing a first operation of dividing the image into a predefined number N of blocks followed by a second extraction operation for each of the blocks ($B_i$) of a data item representing a visual content of the block, the data item of the first type including of a vector (G(Im)) having N components each of which corresponds to a data item representing a visual content extracted for a block of the image;

calculating a similarity between the example image and each image in at least one subset of the stored images, the similarity being calculated from the data of the first type and of the second type associated respectively with the example image and with a stored image, said step of calculating a similarity, denoted SIM, between the example image, denoted Q, and each image, denoted D, from the least one subset of stored images being performed by calculating a distance between a vector G(Q) associated with the example image and a vector G(D) associated with the stored image under consideration, the distance being weighted by means of a plurality N of weighting coefficients $W_i$, a value of each of which is indicative of a degree of proximity in one of the blocks $B_i$ resulting from the division of the images, of regions of interest associated with the example image and with the stored image under consideration; and supplying at least one image, referred to as a result image, of the database, the at least one result image being selected from amongst the stored images in the database according to its degree of similarity with the example image.

28. A computer, comprising means adapted to implement each step of an image indexing method for indexing digital images, comprising the following steps, for each image Im to be indexed:

dividing an image plane of the image Im, in accordance with a partitioning comprising a predefined number N of blocks $B_i$;

extracting from each of the blocks a data item of a first type representing at least one characteristic of a visual content of the block;

defining in the image at least one region of interest, and obtaining a data item of a second type representing a location of at least one region of interest in the image;

calculating for each of the blocks $B_i$ a first coefficient, $W_i^{Im}$, indicating a degree of presence in the block $B_i$ under consideration of the image of the at least one region of interest;

associating with the image Im an index composed of a first vector G(Im), having N components, each of which is one of the data items of the first type, and a second vector W(Im), having N components, each of which is one of the first coefficients $W_i^{Im}$, in which the image Im contains any integer number R of regions of interest, denoted $ROI_r$, being an integer between 1 and R, and wherein in said step of calculating a first coefficient for each of the blocks $B_i$, the first coefficient $W_i^{Im}$ is obtained by means of the following formula:

$$W_i^{Im} = W_o + \sum_{r=1}^{R} P_i^r$$

in which $W_0$ is a predefined constant, and $P_i^r$ is a coefficient indicating a degree of presence of a corresponding region of interest $ROI_r$, in the block $B_i$ under consideration of the image plane of the image Im.

29. A computer, comprising an image search device for searching images from an example image, amongst a plurality of images stored in a database, each of the images having been indexed according to an image indexing method for indexing digital images, comprising the following steps, for each image Im to be indexed:

dividing an image plane of the image Im, in accordance with a partitioning comprising a predefined number N of blocks $B_i$;

extracting from each of the blocks a data item of a first type representing at least one characteristic of a visual content of the block;

defining in the image at least one region of interest, and obtaining a data item of a second type representing a location of at least one region of interest in the image;

calculating for each of the blocks $B_i$ a first coefficient, $W_i^{Im}$, indicating a degree of presence in the block $B_i$ under consideration of the image of the at least one region of interest;

associating with the image Im an index composed of a first vector G(Im), having N components, each of which is one of the data items of the first type, and a second vector W(Im), having N components, each of which is one of the first coefficients $W_i^{Im}$, in which the image Im contains any integer number R of regions of interest, denoted $ROI_r$, r being an integer between 1 and R, and wherein in said step of calculating a first coefficient for each of the blocks $B_i$, the first coefficient $W_i^{Im}$ is obtained by means of the following formula:

$$W_i^{Im} = W_o + \sum_{r=1}^{R} P_i^r$$

in which $W_0$ is a predefined constant, and $P_i^r$ is a coefficient indicating a degree of presence of a corresponding region of interest $ROI_r$, in the block $B_i$ under consideration of the image plane of the image Im, and wherein said device comprises means for implementing each step of an image search method for searching images from the example image, amongst a plurality of images stored in a database, wherein the image search method comprises the following steps:

calculating a similarity SIM between the example image Q and each of the images D from amongst at least one subset of stored images, the similarity being calculated from first vectors G(O), G(D), and second vectors W(Q), W(D), associated respectively with the example image Q and the stored image D, this step being performed by calculating a distance between the first vector G(Q) associated with the example image and the first vector G(D) associated with the stored image under consideration, the distance being weighted by means of a plurality N of weighting coefficients $R_i$, the value of each of which is calculated as a function of the components $W_i^Q$, $W_i^D$ of the second vectors W(Q) and W(D) associated respectively with the example image Q and the stored image D under consideration; and supplying at least one image, referred to as a result image, in the database, the at least one result image being selected from amongst the stored images in the database according to its degree of similarity with the example image.

30. A computer, comprising means adapted to implement an image search method, each of the images being searched having been indexed according to an indexing method comprising the following steps, for each image Im to be indexed:

dividing an image plane of the image Im, in accordance with a partitioning comprising a predefined number N of blocks $B_i$;

extracting from each of the blocks a data item of a first type representing at least one characteristic of a visual content of the block;

defining in the image at least one region of interest, and obtaining a data item of a second type representing a location of at least one region of interest in the image;

calculating for each of the blocks $B_i$ a first coefficient, $W_i^{Im}$, indicating a degree of presence in the block $B_i$ under consideration of the image of the at least one region of interest;

associating with the image Im an index composed of a first vector G(Im), having N components, each of which is one of the data items of the first type, and a second vector W(Im), having N components, each of which is one of the first coefficients $W_i^{Im}$, in which the image Im contains any integer number R of regions of interest, denoted $ROI_r$, r being an integer between 1 and R, and wherein in said step of calculating a first coefficient for each of the blocks $B_i$, the first coefficient $W_i^{Im}$ is obtained by means of the following formula:

$$W_i^{Im} = W_o + \sum_{r=1}^{R} P_i^r$$

in which $W_0$ is a predefined constant, and $P_i^r$ is a coefficient indicating a degree of presence of a corresponding region of interest $ROI_r$, in the block $B_i$ under consideration of the image plane of the image Im.

31. A computer program which can be loaded into programmable apparatus, comprising sequences of instructions or portions of software code for implementing the following steps for searching images, from an example image, from amongst a plurality of images stored in a database, each of the stored images being associated with a data item of a first type representing at least one characteristic of the visual content of the image, each of the stored images being associated with a data item of a second type representing the location of at least one region of interest in the image, when loaded into and executed from by the programmable apparatus:

receiving a data item of the second type representing the location of at least one region of interest in the example image;

receiving a data item of said first type associated with the example image, the data item of the first type being obtained for each of the stored images and for the example image by performing a first operation of dividing the image into a predefined number N of blocks followed by a second extraction operation for each of the blocks $(B_i)$ of a data item representing the visual content of the block, the data item of the first type consisting of a vector (G(Im)) having N components each of which being the data item representing the visual content extracted for a block of the image;

calculating a similarity between the example image and each of the images amongst at least one subset of the stored images, the similarity being calculated from the data of the first type and of the second type associated respectively with the example image and with a stored image, said step of calculating a similarity, denoted SIM, between the example image Q and each of the images D from amongst at least one subset of stored images being performed by calculating a distance between the vector G(Q) associated with the example image and the vector G(D) associated with the stored image under consideration, the distance being weighted by means of a plurality N of weighting coefficients $W_i$, the value of each of which being indicative of a degree of proximity in one of the blocks $B_i$ resulting from the division of the images, of regions of interest associated with the example image and with the stored image under consideration; and supplying at least one image, referred to as a result image, of the database, the at least one result image being selected from amongst the stored images in the database according to its degree of similarity with the example image.

32. A computer program which can be loaded into a programmable apparatus, comprising sequences of instructions or portions of software code for implementing the following steps for indexing digital images, when loaded into and executed by the programmable apparatus, where an image Im to be indexed contains any integer number R of regions of interest, denoted $ROI_r$, r being an integer between 1 and R:

dividing the image plane of the image Im, in accordance with a partitioning comprising a predefined number N of blocks $B_i$;

extracting from each of the blocks a data item of a first type representing at least one characteristic of a visual content of the block;

defining in the image at least one region of interest, and obtaining a data item of a second type representing a location of at least one region of interest in the image;

calculating for each of the blocks $B_i$ a first coefficient, $W_i^{Im}$, indicating a degree of presence in the block $B_i$ under consideration of the image of said at least one region of interest, the first coefficient $W_i^{Im}$ being obtained by means of the following formula:

$$W_i^{Im} = W_o + \sum_{r=1}^{R} P_i^r$$

in which $W_0$ is a predefined constant, and $P_i^r$ is a coefficient indicating a degree of presence of a corresponding region of interest $ROI_r$, in the block $G_i$ under consideration of the image plane of the image Im; and associating with the image Im an index composed of a first vector G(Im), having N components, each of which being one of the data items of the first type, and a second vector W(Im), having N components, each of which being one of the first coefficients $W_i^{Im}$.

* * * * *

UNITED STATES PATENT AND TRADEMARK OFFICE
CERTIFICATE OF CORRECTION

PATENT NO. : 6,782,395 B2
DATED : August 24, 2004
INVENTOR(S) : Lillian Labelle

It is certified that error appears in the above-identified patent and that said Letters Patent is hereby corrected as shown below:

Title page,
Item [56], References Cited, OTHER PUBLICATIONS, "NeTra:" reference, after "NeTra", "Lare" should read -- Large --.

Column 13,
Lines 52-54, " $W_i = \sum_{t=1}^{T} \sum_{r-1}^{R} P_i^{r,t}$ " should read -- $W_i = \sum_{t=1}^{T} \sum_{r=1}^{R} P_i^{r,t}$ --.

Column 14,
Line 23, "image." should read -- image. Still at step S510, a counter i is initialised to the value 1. --; and "Following" should read -- At the following --;
Line 24, "Step" should read -- step --; and
Line 30, "nonempty parts" should read -- non-empty parts, --.

Column 15,
Line 35, "$W_{iIm}$" should read -- $W_i^{Im}$ --.

Column 28,
Line 52, "G(Q)" should read -- G(D) --;
Line 66, "for" should be deleted.

Column 30,
Line 62, "G(O)," should read -- G(Q), --.

Signed and Sealed this

Thirtieth Day of August, 2005

JON W. DUDAS
*Director of the United States Patent and Trademark Office*